(12) United States Patent
Sheth et al.

(10) Patent No.: US 8,335,692 B2
(45) Date of Patent: Dec. 18, 2012

(54) SYSTEMS AND METHODS TO SUPPORT INFORMATION TECHNOLOGY BUSINESS DECISIONS

(75) Inventors: Alpesh Sheth, San Jose, CA (US); Mahipal Lunia, Mountain View, CA (US); Paul Peissner, Pleasanton, CA (US)

(73) Assignee: BladeLogic, Inc., Houston, TX (US)

( * ) Notice: Subject to any disclaimer, the term of this patent is extended or adjusted under 35 U.S.C. 154(b) by 273 days.

(21) Appl. No.: 12/604,592

(22) Filed: Oct. 23, 2009

(65) Prior Publication Data
US 2010/0106656 A1 Apr. 29, 2010

Related U.S. Application Data

(60) Provisional application No. 61/108,432, filed on Oct. 24, 2008.

(51) Int. Cl.
*G06Q 10/00* (2006.01)
(52) U.S. Cl. .......... 705/1.1; 705/7.12; 705/7.13
(58) Field of Classification Search .......... 705/300–301, 705/348
See application file for complete search history.

(56) References Cited

U.S. PATENT DOCUMENTS

| 2004/0107125 A1* | 6/2004 | Guheen et al. ............ 705/7 |
| 2007/0261018 A1* | 11/2007 | Sanghvi et al. ............ 717/100 |
| 2009/0012800 A1* | 1/2009 | Devarakonda et al. ...... 705/1 |
| 2009/0077020 A9* | 3/2009 | Toong et al. ............... 707/3 |

* cited by examiner

*Primary Examiner* — Candice D Wilson

(57) ABSTRACT

Various embodiments include methods and systems to support IT business decision making, including a data correlator and business, configuration, risk, and application management databases. The business management database contains information pertaining to services offered by IT and other IT business information. The configuration management database contains operational data including the resources required by IT's offered services. The risk management database contains operational constraints on the organization by external sources, such as industry practices or government regulations. The application management database contains information about projects and applications that are in development but not currently operational including resources required by IT's services now or in the future. The data correlator defines relationships between related data residing in one or more of the databases, allowing a single convenient location to access data useful in making business decisions for an organization's information technology department. In various embodiments the data correlator includes a what-if analyzer to model decisions and determine the impact of those decisions. In various embodiments snapshots may be taken of the configuration management database to be used later to determine the operational state at a previous time and assess changes to the configuration management database between that time and the present.

22 Claims, 18 Drawing Sheets

SYSTEMS AND METHODS TO SUPPORT INFORMATION TECHNOLOGY BUSINESS DECISIONS

CLAIM OF PRIORITY

This patent application claims the benefit of priority, under 35 U.S.C. Section 119(e), U.S. Provisional Patent Application Ser. No. 61/108,432, entitled "INFORMATION TECHNOLOGY BUSINESS DECISION SUPPORT," filed on Oct. 24, 2008; the disclosure of which is incorporated by reference herein and below in its entirety.

TECHNICAL FIELD

This document pertains generally to information technology (IT) management, and more particularly, but not by way of limitation, to systems and methods for supporting IT business decisions.

BACKGROUND

To make informed IT business decisions, decision makers need access to a wide variety of data including operational information, regulatory information and strategic or operational business information. Typically the data is split among a variety of applications designed to deal with a specific data domain, e.g. financial applications. In addition to specific domain applications, the data may be stored in numerous spreadsheets or other solutions that tend to isolate data into specific interest silos and make correlating useful data a laborious manual process. The use of so many applications and solutions further complicates the problem because the data may exist in many different forms, adding to the decision maker's burden when trying to use the data. Integrating the IT data and correlating related data may provide decision makers with a convenient and comprehensive data set from which to make informed decisions.

Overview

Data useful to support IT business decisions can be systematically integrated into databases. Data relationships between data in the databases can also be defined and used to present related data which may be useful to a decision maker. Using the databases and the data relationships, in addition to finding related data useful in supporting IT business decisions, decision makers can also perform what-if analysis and can snapshot operational parameters for later use. This document provides numerous examples in the detailed description, an overview of which is included below.

Example 1 describes a system for supporting IT business decisions within an organization. In this example, the system comprises using at least one processor operable to execute: a business management database (BMDB), wherein the BMDB defines a plurality of services needed by the organization and a constraint on the plurality of services driven by a business policy; a configuration management database (CMDB), connected to the BMDB, wherein the CMDB defines resources required by the plurality of services; and a data correlator, coupled to the BMDB and the CMDB, configured to define data relationships between data within the BMDB and the CMDB.

In Example 2, the system of Example 1 is optionally configured such that the data correlator includes: a first set of relationships between vendor information within the BMDB and corresponding vendors within the CMDB; a second set of relationships between asset information within the BMDB and corresponding assets within the CMDB; a third set of relationships between application information within the BMDB and corresponding applications within the CMDB; a fourth set of relationships between client information within the BMDB and corresponding clients within the CMDB; and a fifth set of relationships between service definitions within the BMDB and corresponding service components within the CMDB.

In Example 3, the system of one or any combination of Examples 1-2 is optionally configured such that the data correlator identifies related data within the BMDB or the CMDB.

In Example 4, the system of one or any combination of Examples 1-3 is optionally configured such that the data correlator includes a what-if analyzer configured to: create copies of one or more of the BMDB and the CMDB; change the copies; and use the changed copies to provide what-if analysis of IT business decisions.

In Example 5, the system of one or any combination of Examples 1-4 is optionally configured such that the data correlator includes a CMDB change analyzer configured to: create a copy of the CMDB; store the CMDB copy as a representation of the CMDB at a particular point in time; and compare data within the CMDB copy to data within the CMDB to identify changes in the CMDB after the particular point in time.

Example 6 describes a system for supporting IT business decisions within an organization. In this example, the system comprises using at least one processor operable to execute: a business management database (BMDB), wherein the BMDB defines a plurality of services needed by the organization and a constraint on the plurality of services driven by a business policy; a configuration management database (CMDB), connected to the BMDB, wherein the CMDB defines resources required by the plurality of services; a risk management database (RMDB), connected to the BMDB, wherein the RMDB defines an operational constraint on the organization due to an external factor; and a data correlator, coupled to the BMDB, the CMDB, and the RMDB, configured to define data relationships between data within the BMDB and the CMDB, and data relationships between data within the BMDB and the RMDB.

In Example 7, the system of Example 6 is optionally configured such that the data correlator includes: a first set of relationships between vendor information within the BMDB and corresponding vendors within the CMDB; a second set of relationships between asset information within the BMDB and corresponding assets within the CMDB; a third set of relationships between application information within the BMDB and corresponding applications within the CMDB; a fourth set of relationships between client information within the BMDB and corresponding clients within the CMDB; and a fifth set of relationships between service definitions within the BMDB and corresponding service components within the CMDB.

In Example 8, the system of one or any combination of Examples 6-7 is optionally configured such that the data correlator identifies related data within the BMDB, the CMDB or the RMDB.

In Example 9, the system of one or any combination of Examples 6-8 is optionally configured such that the data correlator includes a what-if analyzer configured to: create copies of one or more of the BMDB, the CMDB, and the RMDB; change the copies; and use the changed copies to provide what-if analysis of IT business decisions.

In Example 10, the system of one or any combination of Examples 6-9 is optionally configured such that the data correlator includes a CMDB change analyzer configured to: create a copy of the CMDB; store the CMDB copy as a representation of the CMDB at a particular point in time; and compare data within the CMDB copy to data within the CMDB to identify changes in the CMDB after the particular point in time.

Example 11 describes a system for supporting IT business decisions within an organization. In this example, the system comprises using at least one processor operable to execute: a business management database (BMDB), wherein the BMDB defines a plurality of services needed by the organization and a constraint on the plurality of services driven by a business policy; a configuration management database (CMDB), connected to the BMDB, wherein the CMDB defines resources required by the plurality of services; an application management database (AMDB), connected to the BMDB and CMDB, wherein the AMDB defines development resources required by the plurality of services; and a data correlator, coupled to the BMDB, the CMDB, and the AMDB and configured to define data relationships between data within the BMDB, the CMDB, and the AMDB.

In Example 12, the system of Example 11 is optionally configured such that the data correlator includes: a first set of relationships between vendor information within the BMDB and corresponding vendors within the CMDB; a second set of relationships between asset information within the BMDB and corresponding assets within the CMDB; a third set of relationships between application information within the BMDB and corresponding applications within the CMDB; a fourth set of relationships between client information within the BMDB and corresponding clients within the CMDB; and a fifth set of relationships between service definitions within the BMDB and corresponding service components within the CMDB or the AMDB.

In Example 13, the system of one or any combination of Examples 11-12 is optionally configured such that the data correlator identifies related data within the BMDB, the CMDB, or the AMDB.

In Example 14, the system of one or any combination of Examples 11-13 is optionally configured such that the data correlator includes a what-if analyzer configured to: create copies of one or more of the BMDB, the CMDB, and the AMDB; change the copies; and use the changed copies to provide what-if analysis of IT business decisions.

In Example 15, the system of one or any combination of Examples 11-14 is optionally configured such that the data correlator includes a CMDB change analyzer configured to: create a copy of the CMDB; store the CMDB copy as a representation of the CMDB at a particular point in time; and compare data within the CMDB copy to data within the CMDB to identify changes in the CMDB after the particular point in time.

Example 16 describes a computer-implemented method. In this example, the method comprises: defining a plurality of services needed by the organization and a constraint on the plurality of services driven by a business policy in a business management database (BMDB); defining resources required by the plurality of services in a configuration management database (CMDB); defining data relationships between data within the BMDB and the CMDB; and supporting IT business decisions, using one or more processors, by analyzing the data relationships to present data from within the BMDB or the CMDB to a data access application.

In Example 17, the method of Example 16 is optionally performed such that defining data relationships includes: defining a first set of relationships between vendor information within the BMDB and corresponding vendors within the CMDB; defining a second set of relationships between asset information within the BMDB and corresponding assets within the CMDB; defining a third set of relationships between application information within the BMDB and corresponding applications within the CMDB; defining a fourth set of relationships between client information within the BMDB and corresponding clients within the CMDB; and defining a fifth set of relationships between service definitions within the BMDB and corresponding service components within the CMDB.

In Example 18, the method of one or any combination of Examples 16-17 optionally is performed such that analyzing the data relationships includes identifying related data within the BMDB or the CMDB.

In Example 19, the method of one or any combination of Examples 16-18 optionally is performed such that supporting IT business decisions includes: creating copies of one or more of the BMDB and the CMDB; changing the copies; and using the changed copies to provide what-if analysis of IT business decisions.

In Example 20, the method of one or any combination of Examples 16-19 optionally is performed such that supporting IT business decisions includes: creating a copy of the CMDB; storing the CMDB copy as a representation of the CMDB at a particular point in time; and comparing data within the CMDB copy to data within the CMDB to identify changes in the CMDB after the particular point in time.

Example 21 describes a computer-implemented method. In this example, the method comprises: defining a plurality of services needed by the organization and a constraint on the plurality of services driven by a business policy in a business management database (BMDB); defining resources required by the plurality of services in a configuration management database (CMDB); defining an operational constraint on the organization, the constraint due to an external factor, in a risk management database (RMDB); defining data relationships between data within the BMDB and the CMDB, and data relationships between data within the BMDB and the RMDB; and supporting IT business decisions, using one or more processors, by analyzing the data relationships to present data from within the BMDB, the CMDB, or the RMDB to a data access application.

In Example 22, the method of Example 21 is optionally performed such that defining data relationships includes: defining a first set of relationships between vendor information within the BMDB and corresponding vendors within the CMDB; defining a second set of relationships between asset information within the BMDB and corresponding assets within the CMDB; defining a third set of relationships between application information within the BMDB and corresponding applications within the CMDB; defining a fourth set of relationships between client information within the BMDB and corresponding clients within the CMDB; and defining a fifth set of relationships between service definitions within the BMDB and corresponding service components within the CMDB.

In Example 23, the method of one or any combination of Examples 21-22 optionally is performed such that analyzing the data relationships includes identifying related data within the BMDB, the CMDB, or the RMDB.

In Example 24, the method of one or any combination of Examples 21-23 optionally is performed such that supporting IT business decisions includes: creating copies of one or more of the BMDB, the CMDB, and the RMDB; changing the copies; and using the changed copies to provide what-if analysis of IT business decisions.

In Example 25, the method of one or any combination of Examples 21-24 optionally is performed such that supporting IT business decisions includes: creating a copy of the CMDB; storing the CMDB copy as a representation of the CMDB at a particular point in time; and comparing data within the CMDB copy to data within the CMDB to identify changes in the CMDB after the particular point in time.

Example 26 describes a computer-implemented method. In this example, the method comprises: defining a plurality of services needed by the organization and a constraint on the plurality of services driven by a business policy in a business management database (BMDB); defining resources required by the plurality of services in a configuration management database (CMDB); defining development resources required by the plurality of services in an application management database (AMDB); defining data relationships between data within the BMDB, the CMDB, and the AMDB; and supporting IT business decisions, using one or more processors, by analyzing the data relationships to present data from within the BMDB, the CMDB, or the AMDB to a data access application.

In Example 27, the method of Example 26 is optionally performed such that defining data relationships includes: defining a first set of relationships between vendor information within the BMDB and corresponding vendors within the CMDB; defining a second set of relationships between asset information within the BMDB and corresponding assets within the CMDB; defining a third set of relationships between application information within the BMDB and corresponding applications within the CMDB; defining a fourth set of relationships between client information within the BMDB and corresponding clients within the CMDB; and defining a fifth set of relationships between service definitions within the BMDB and corresponding service components within the CMDB or the AMDB.

In Example 28, the method of one or any combination of Examples 26-27 optionally is performed such that analyzing the data relationships includes identifying related data within the BMDB, the CMDB, or the AMDB.

In Example 29, the method of one or any combination of Examples 26-28 optionally is performed such that supporting IT business decisions includes: creating copies of one or more of the BMDB, the CMDB, and the AMDB; changing the copies; and using the changed copies to provide what-if analysis of IT business decisions.

In Example 30, the method of one or any combination of Examples 26-29 optionally is performed such that supporting IT business decisions includes: creating a copy of the CMDB; storing the CMDB copy as a representation of the CMDB at a particular point in time; and comparing data within the CMDB copy to data within the CMDB to identify changes in the CMDB after the particular point in time.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An organization's Information Technology ("IT") department delivers services to the organization. Decision makers must manage IT to support the organization's business and may make better, fact-based, decisions if they have ready access to a variety of information. Useful information on the business aspects of IT services includes financial, vendor, compliance, project, and resource management data. Typically this data has been stored in numerous domain specific solutions, or point products, including spreadsheets, text documents, project files, databases, and corporate financial systems. Storing the data in this way segregates the data, both in location and form, and forces decision makers to use numerous point products to find and then use the information.

This and other problems are addressed by the various methods and systems described herein.

Systematically gathering disparate and scattered data provides decision makers with information to make informed, fact-based decisions. Low-level configuration data stored in a configuration management database ("CMDB") can be connected with higher level business management information stored in a business management database ("BMDB"). Similarly, low-level information regarding future applications and projects, stored in an application management database ("AMDB") can be connected to the BMDB. High-level governance and policy information stored in a risk management database ("RMDB") can also be connected to the BMDB. Federating connected databases by defining relationships between the data they contain provides a platform decision makers can exploit to gain ready access to once scattered information. Decision makers can start with low-level data and work their way up to higher level data, or they may start at the top and work their way down. Decision makers are provided with greater, and more useful, information to make informed, fact-based decisions.

Figure 1:
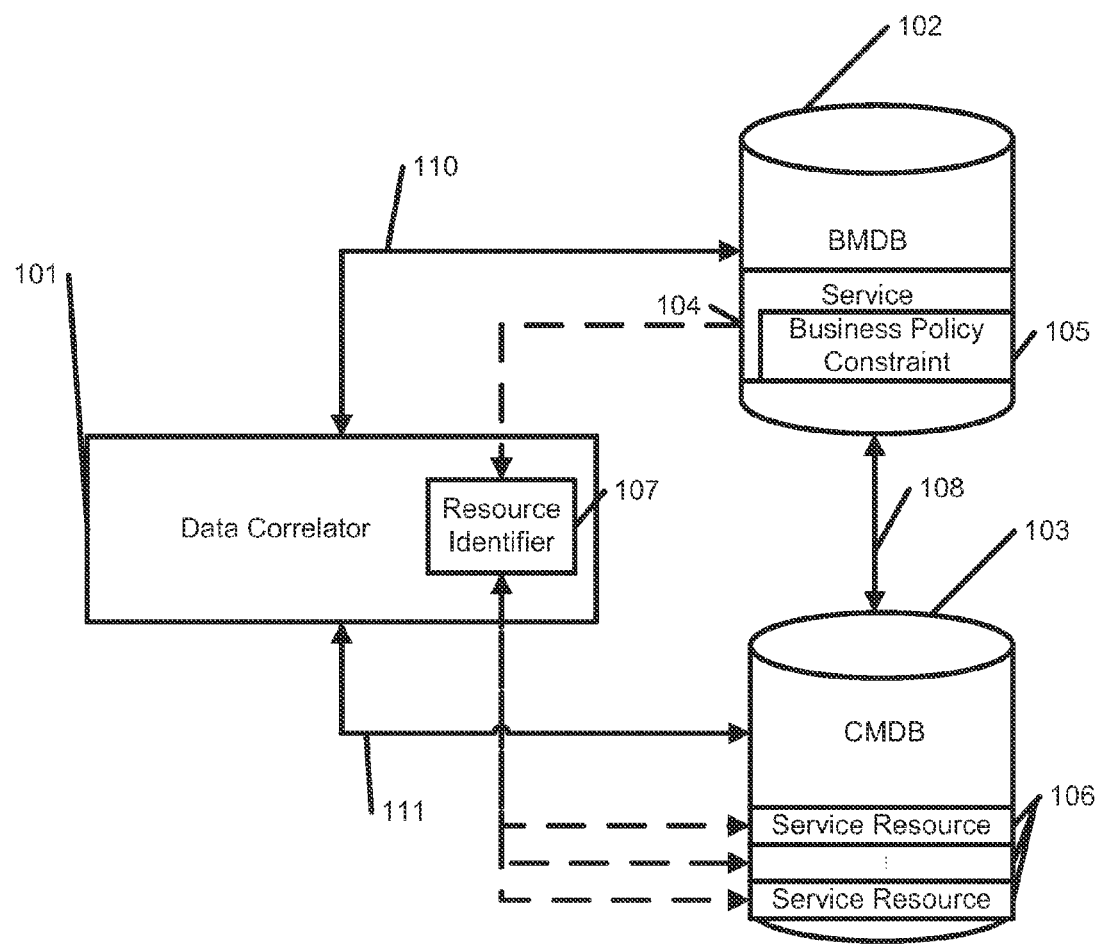
FIG. 1 illustrates an example of an IT business decision support system including a business management database, a configuration management database, and a data correlator.

FIG. 1 illustrates an example system to support IT business decisions, including a data correlator 101, a BMDB 102, and a CMDB 103. The BMDB 102 includes a plurality of service definitions 104 with each of the service definitions 104 including a business policy constraint 105. In various examples, the service definitions 104 are services provided by IT to the organization and can include, but are not limited to, email, data storage, business applications, and desktop support. In various examples the service definitions 104 can include information on finances, vendors, customers, clients, IT policies, and assets. In various examples the business policy constraint 105 can be, but is not limited to, vendor preference (using preferred vendors), data retention policies, application service agreements, or customer service goals. In various examples the BMDB 102 is an electronic data store capable of holding data and returning data in response to a request and can include, for example, a relational database or an object database.

The CMDB 103 includes the service resources 106 required by the service definitions 104 in the BMDB 102. In various examples the service resources 106 can include operational information that is collected using automated discovery tools. In various examples the service resources 106 include information about customers, clients, and users. In various examples the CMDB 102 is an electronic data store capable of holding data and returning data in response to a request and can include, for example, a relational database or an object database.

In various examples the BMDB 102 is coupled to the CMDB 103 through connection 108. Connection 108 is not limited to any particular type of connection, and can include any type of connection or types of connections used to couple the BMDB 102 to the CMDB 103 including, but not limited to, database foreign keys and standard or proprietary database access protocols. In various examples the BMDB 102 and the CMDB 103 can be distinct from each other or can reside within one database.

The data correlator 101 can include a resource identifier 107 which is used to correlate the service definitions 104 and the service resources 106. In various examples the data correlator 101 is coupled to the BMDB 102 through connection 110. In various examples the data correlator 101 is coupled to the CMDB 103 through connection 111. Connection 110, and connection 111 are not limited to any particular type of connection, and can include any type of connection or types of connections used to couple the data correlator 101 to the BMDB 102 or the CMDB 103, including, but not limited to, database foreign keys and standard or proprietary database access protocols.

In various examples, the data correlator 101 is a software program that executes on one or more processors. In various examples the data correlator 101 can execute on the same processor or a different processor as the BMDB 102 or the CMDB 103.

Figure 2:
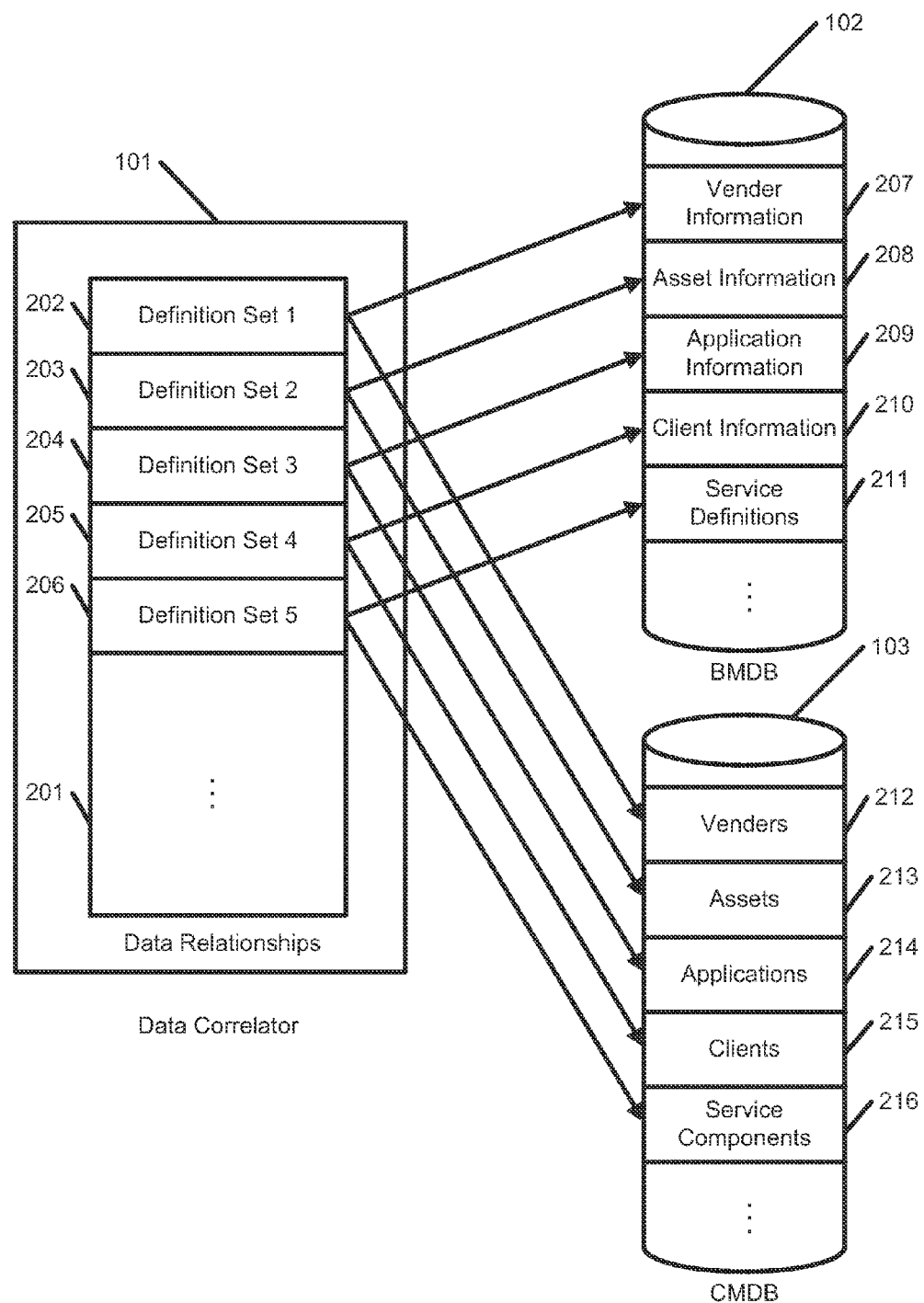
FIG. 2 illustrates an example of data relationships in an IT business decision support system.

Referring to FIG. 2, in various examples the data correlator 101 includes data relationships 201 between the BMDB 102 and the CMDB 103 data. In various examples the data relationships 201 can include, but are not limited to, five sets of relationships including: a definition set 1 202 that correlates vendor information 207 in the BMDB 102 with venders 212 stored in the CMDB 103; a definition set 2 203 that correlates asset information 208 in the BMDB 102 with assets 213 stored in the CMDB 103; a definition set 3 204 that correlates application information 209 in the BMDB 102 with applications 214 stored in the CMDB 103; a definition set 4 205 that correlates client information 210 in the BMDB 102 with clients 215 stored in the CMDB 103; and a definition set 5 206 that correlates service definitions 211 in the BMDB 102 with service components 216 stored in the CMDB 103.

Figure 3:
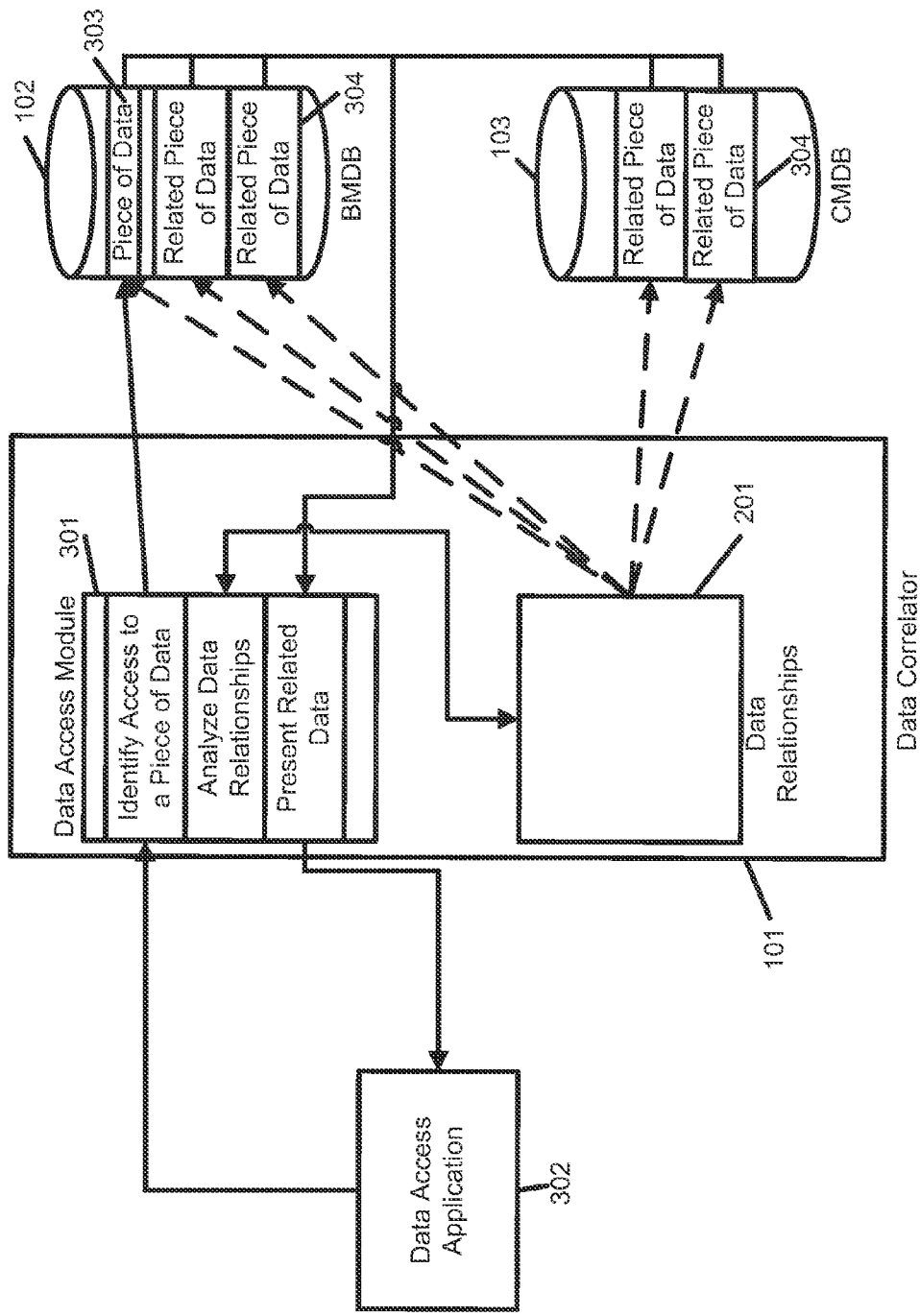
FIG. 3 illustrates an example of an IT business decision support system including a data access module and shows data flow in the system.

Referring to FIG. 3, in various examples the data correlator 101 can include a data access module 301. The data access module 301 identifies access to a piece of data 303 by a data access application 302. In various examples the data access application 302 can be an interactive application providing a user with the ability to query data within the BMDB 102 or the CMDB 103. In various examples the data access application 302 can be a non-interactive batch program capable of querying data within the BMDB 102 or the CMDB 103. In various examples the data access application 302 queries data using the data correlator 101. In various examples the data access application 302 accesses the BMDB 102 or the CMDB 103 directly and the data access module 301 can be made aware of the access, such as, for one example, by a database trigger.

Once the data access module 301 identifies access to the piece of data 303 it analyzes the data relationships 201 to find related pieces of data 304. It will be understood that the related pieces of data 304 can be the same data or different data as long as the data is related to the piece of data 303. The related pieces of data 304 are then presented to the data access application 302. In various examples presenting the related pieces of data 304 can include returning the data to the data access application 302. In various examples the piece of data 303 can reside in any of the BMDB 102, as shown, or the CMDB 103 and a related piece of data can similarly reside in any of the BMDB 102 or the CMDB 103. In various examples there can be one or more related pieces of data 702 associated with each piece of data 701. In various examples presenting the related pieces of data 304 can include returning a reference list informing the data access application 302 where to locate the related pieces of data 304. To give an example, a decision maker may want to terminate the email service in the organization. The decision maker would query the service, which is the piece of data 303, and would receive, for example, a list of the email service's customers, which are the related pieces of data 304. Thus, the decision maker advantageously receives useful data, the customer list, in the context of the piece of data 303 he originally sought, the email service, to make convenient and informed decisions.

Figure 4:
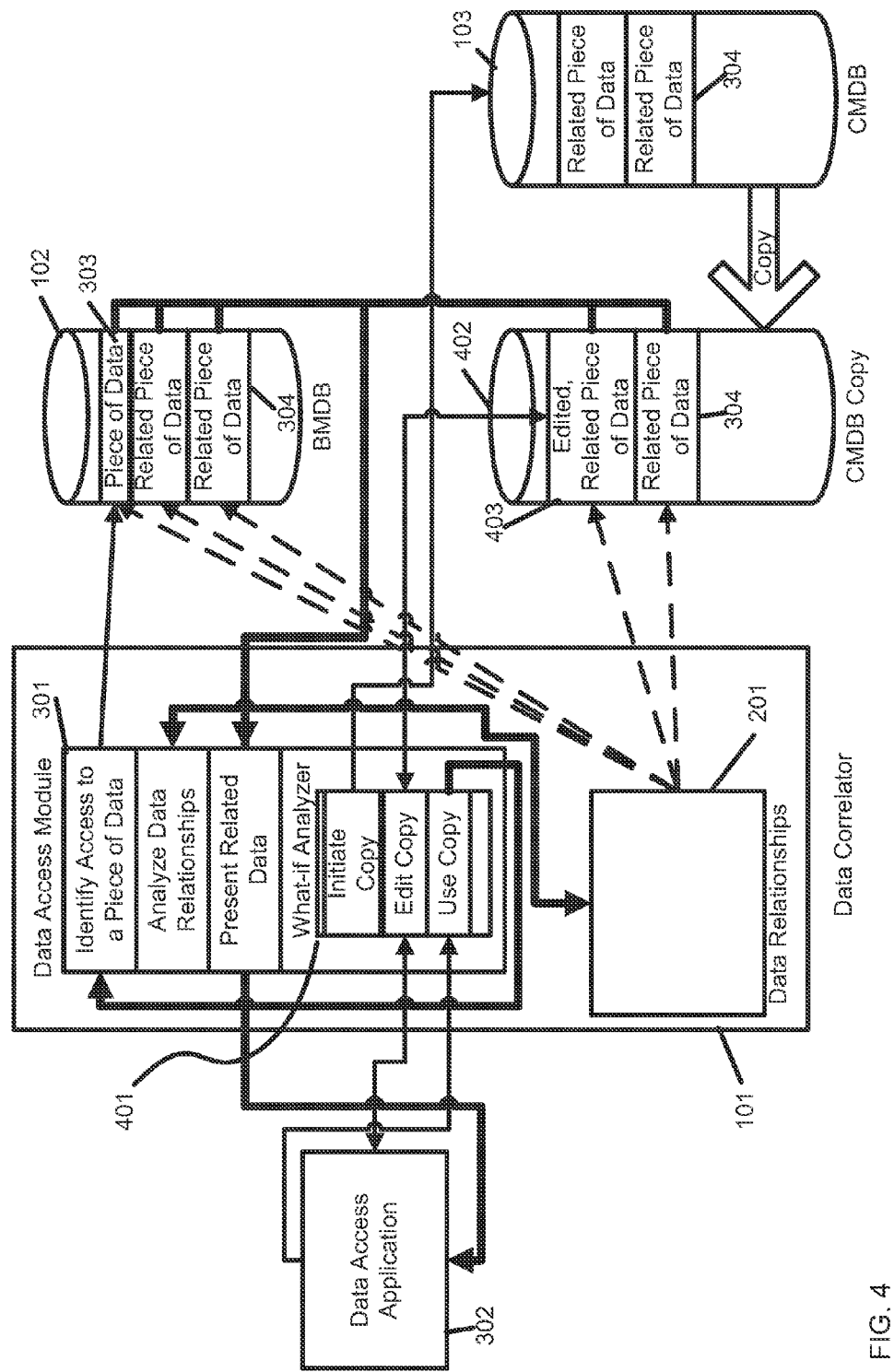
FIG. 4 illustrates an example of an IT business decision support system which includes a what-if analyzer and shows data flow in the system.

Referring to FIG. 4, in various examples the data correlator 101 can include a what-if analyzer 401. The what-if analyzer 401 can operate on the BMDB 102 or the CMDB 103, but the CMDB 103 is shown in FIG. 4 as an illustrative example. In various examples the data access application 302 uses the what-if analyzer 401 by creating a CMDB copy 402 from the CMDB 103. The data access application 302 then edits the CMDB copy 402. In various examples, for example, the edited piece of data 403 represents all or part of a scenario a decision maker would like to run, such as the budget or compliance impact of eliminating an application. After the changes are applied to the CMDB copy 402 the CMDB copy 402 is used in place of the CMDB 103 in a manner similar to that previously described with respect to FIG. 3. That is, the data access application 302 accesses a piece of data 303, the data access module 301 identifies access to the piece of data 303, the data access module 301 analyzes the data relationships 201 to find related pieces of data 304, and the related pieces of data 304 are then presented to the data access application 302. In this way the decision makers have a facility to predict the organizational impacts of decisions related to the piece of data 303 originally considered. Predicting the effects of decisions without implementing them will greatly increase the decision maker's ability to eliminate poor choices before the choices impact the organization.

Figure 5:
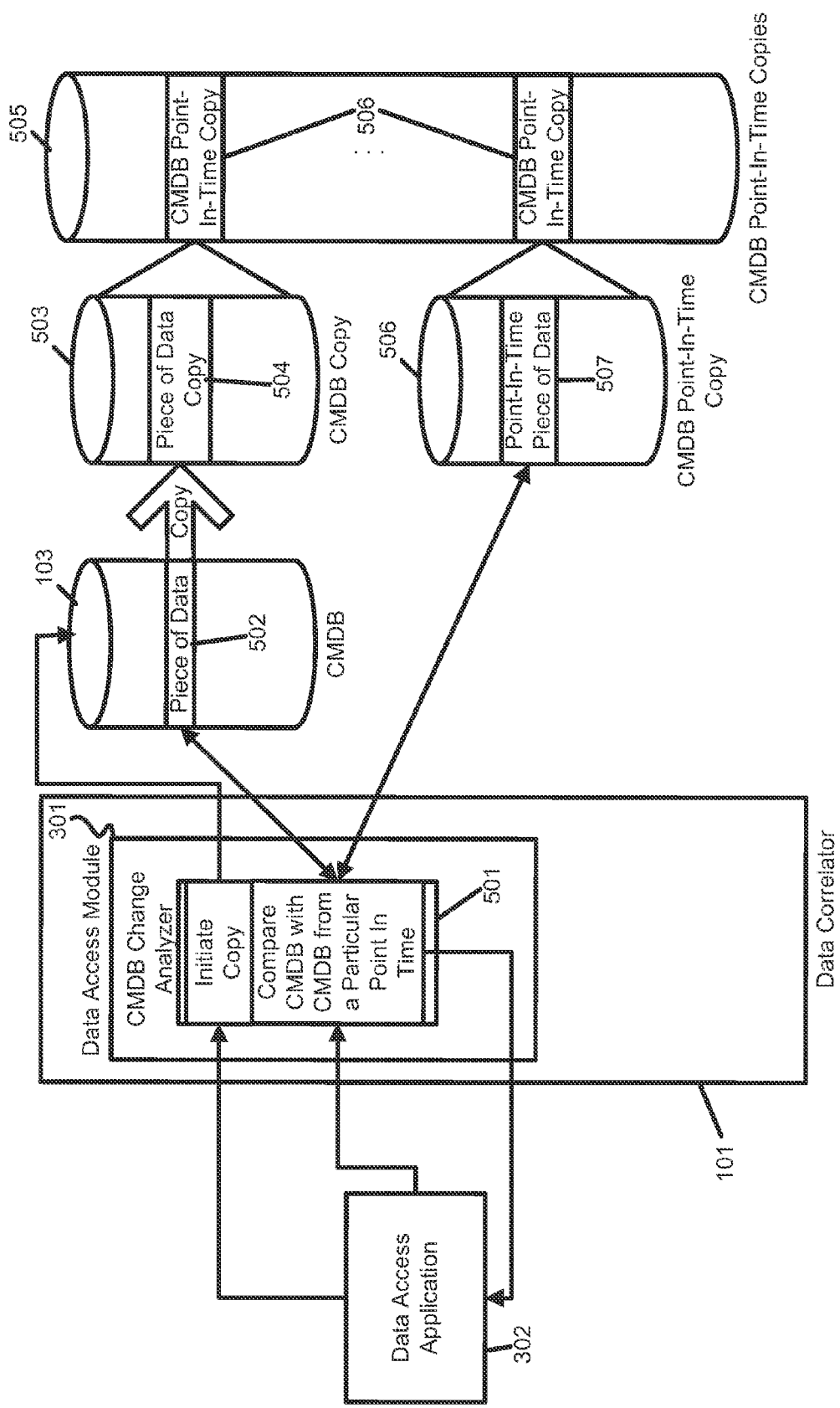
FIG. 5 illustrates an example of an IT business decision support system including a configuration management database change analyzer and data flow in the system.

Referring to FIG. 5, in various examples the data correlator 101 can include a CMDB change analyzer 501. In various examples the CMDB change analyzer can be separate from the data correlator 101 and can be placed with the CMDB 103. In various examples, the CMDB change analyzer 501 creates a CMDB copy 503. Creating the CMDB copy 503 can occur at the request of the data access application 302, or can be scheduled in some way. Creating the CMDB copy 503 may also be known as a "snapshot" of the CMDB 103.

Once the CMDB copy 503 is made, it is stored in a repository of CMDB point-in-time ("PiT") copies 505 and becomes a CMDB PiT copy 506. At some later date, a CMDB PiT copy 506 can be retrieved from the repository 505 and compared to the CMDB 103. In various examples the CMDB PiT copy 506 retrieval and comparison can be initiated by the data access application or can be scheduled in some way. In various examples comparing the CMDB PiT copy 506 with the CMDB 103 can involve comparing a piece of data 502 in the CMDB 103 and a corresponding PiT piece of data 507 in the CMDB PiT copy 506. In various examples the comparison can involve many pieces of data within the CMDB 103 and the CMDB PiT copy 506. In various examples comparing the CMDB 103 with the CMDB PiT copy 506 may reveal operational changes affecting current services, such as, for example, a web browser upgrade occurring at about the same time an application required to perform a service stops working.

Figure 6:
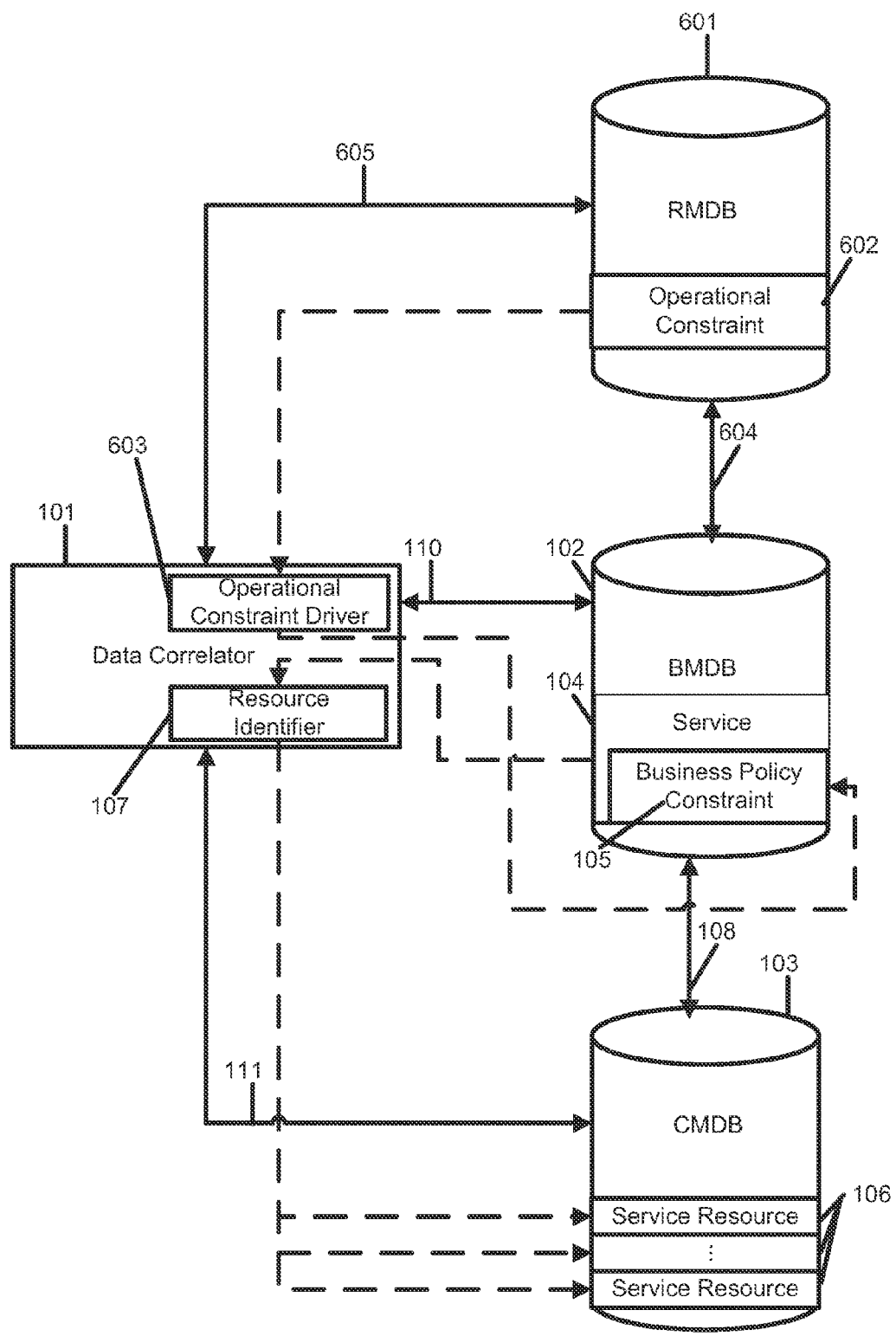
FIG. 6 illustrates an example of an IT business decision support system including a risk management database, a business management database, a configuration management database, and a data correlator.

Referring to FIG. 6, in various examples the system discussed in FIG. 1 can include a RMDB 601. In various examples the RMDB 601 contains one or more operational constraints 602 on the organization. The operational constraints 602 can come from sources external to the organization, such as industry groups, government agencies, or statutes. In various examples the operational constraints 602 can influence the business policy constraint 105 in the BMDB 102. In various examples the RMDB 601 is an electronic data store capable of holding data and returning data in response to a request and can include, for example, a relational database or an object database.

In various examples the RMDB 601 is coupled to the BMDB 102 through connection 604. Connection 604 is not limited to any particular type of connection, and can include any type of connection or types of connections used to couple the RMDB 601 to the BMDB 102 including, but not limited to, database foreign keys and standard or proprietary database access protocols. In various examples the RMDB 601, the BMDB 102, and the CMDB 103 can be distinct from each other or can reside within one or more databases.

The data correlator 101 can include an operational constraint driver 603 which can be used to correlate the operational constraint 602 with the business policy constraint 105. In various examples the data correlator 101 is coupled to the RMDB 601 through connection 605. Connection 605 is not limited to any particular type of connection, and can include any type of connection or types of connections used to couple the data correlator 101 to the RMDB 601, including, but not limited to, database foreign keys and standard or proprietary database access protocols. In various examples the data correlator 101 can execute on the same processor or a different processor as the RMDB 601.

Figure 7:
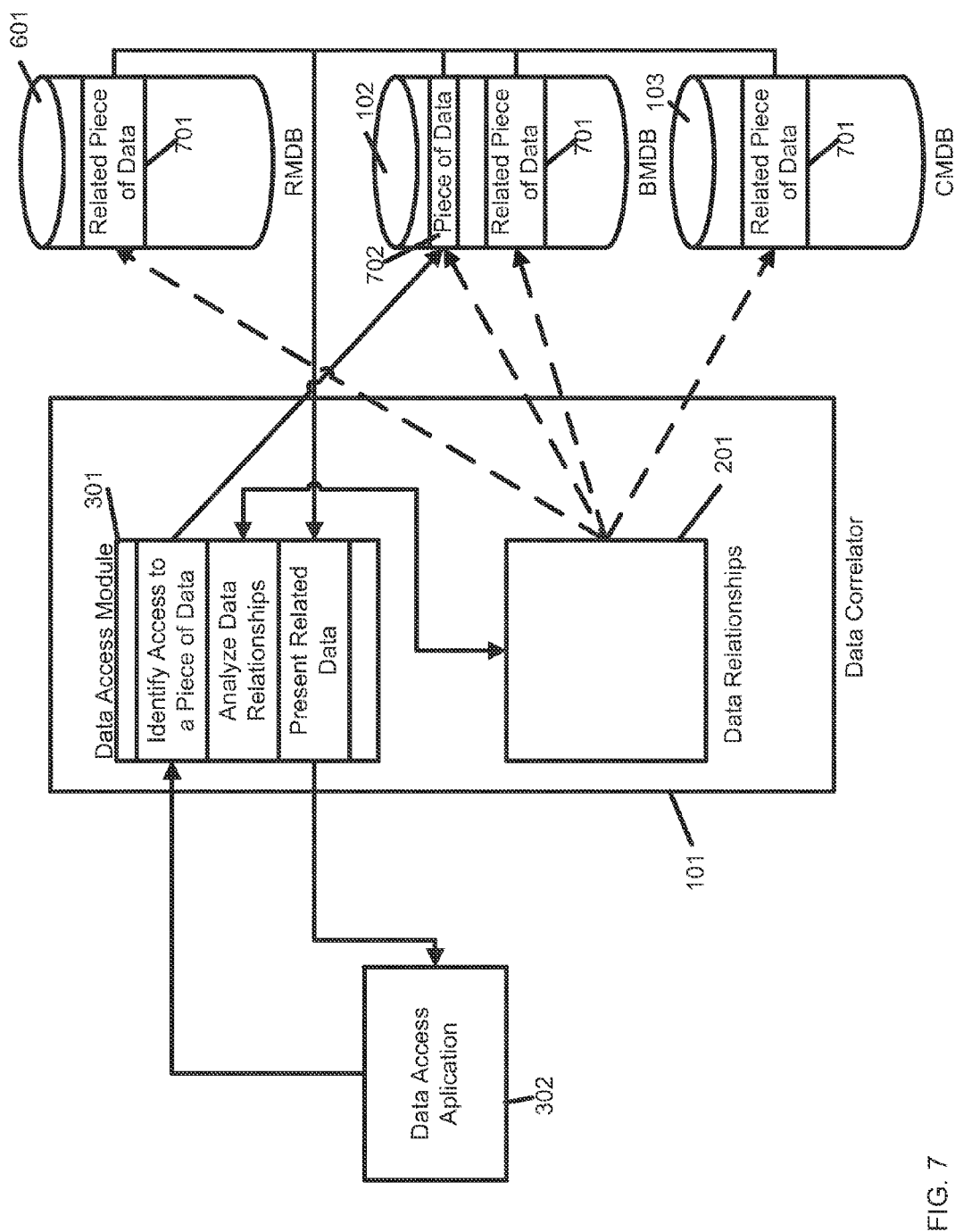
FIG. 7 illustrates an example of an IT business decision support system including a data access module and shows data flow in the system.

Referring to FIG. 7, in various examples the system shown in FIG. 3 is modified to include the RMDB 601. FIG. 7 shows, as an example, a piece of data 702 in the BMDB 102 accessed by the data access application 302 and related pieces of data 701 residing on the RMDB 601, the BMDB 102, and the CMDB 103. It will be understood that the related pieces of data 701 can be the same data or different data as long as the data is related to the piece of data 702. In various examples the piece of data 702 can reside on any of the RMDB 601, the BMDB 102, or the CMDB 103 and a related piece of data 701 can similarly reside on any of the RMDB 601, the BMDB 102, or the CMDB 103. In various examples there can be one or more related pieces of data 701 associated with each piece of data 702. Including the RMDB 601 provides great advantages to decision maker's ability to make informed, fact-based, decisions by increasing the information available to them, in one convenient place, e.g. incorporate compliance data, or other data, that the organization has a responsibility to act upon.

Figure 8:
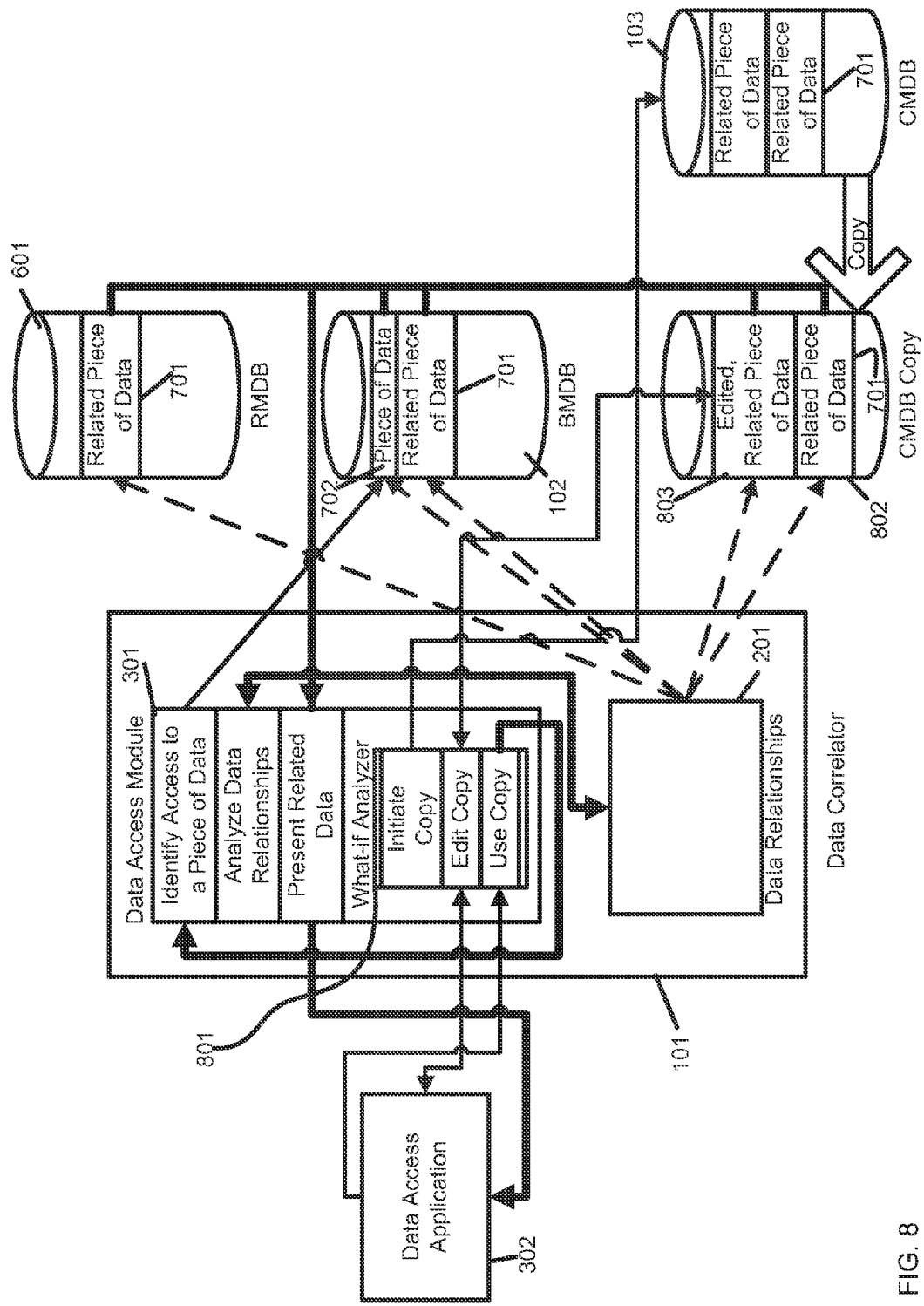
FIG. 8 illustrates an example of an IT business decision support system which includes a what-if analyzer and shows data flow in the system.

Referring to FIG. 8, in various examples, the system shown in FIG. 4, and previously described, includes the RMDB 601. The what-if analyzer 801 operates in a similar manner as the what-if analyzer 401 shown in FIG. 4. Using the CMDB 103 as an example, the CMDB 103 is copied to the CMDB copy 802. The CMDB copy 802 is changed and now includes an edited, related piece of data 803. Using the CMDB copy 802 in place of the CMDB 103, the system shown in FIG. 7, and previously described, then presents the related pieces of data 701 and 803 to the data access application 302. Although FIG. 8 shows the CMDB 103 being copied, various examples would apply the same mechanism to the RMDB 601 or the BMDB 102. In this way, advantageously, decision makers can receive useful information regarding operational constraints 602 due to external factors, e.g. government regulations, which can impact decisions to change IT services, such as, for example, changing a data retention policy.

Figure 9:
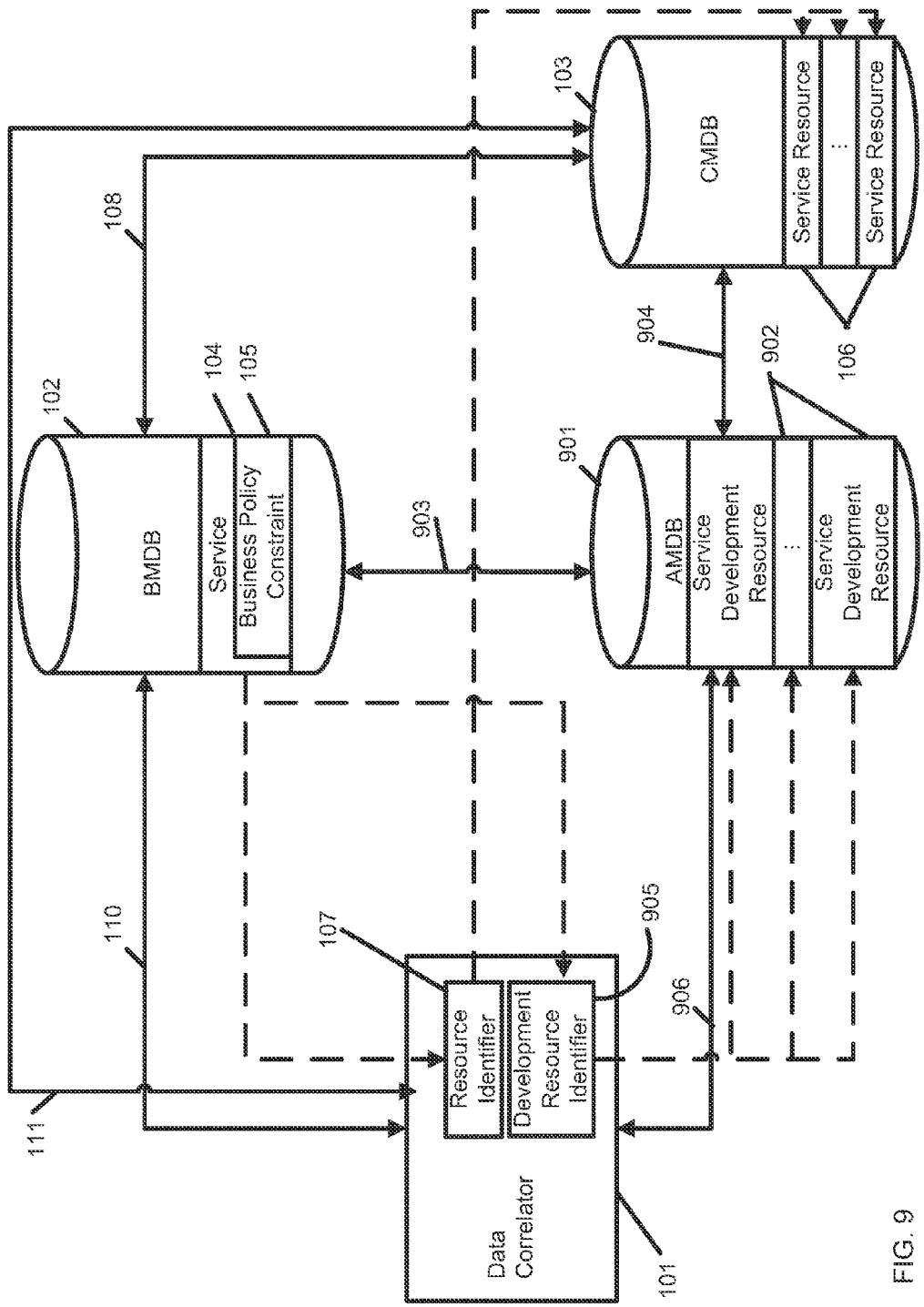
FIG. 9 illustrates an example of an IT business decision support system including a business management database, a configuration management database, an application management database, and a data correlator.

Referring to FIG. 9, in various examples the system shown in FIG. 1 can include an AMDB 901. The AMDB 901 contains one or more service development resources 902. Service development resources 902 can be service components required now, or in the future, by the service definition 104 in the BMDB 102. Service development resources 902 can include, for example, data about application development, future projects, or development financial data. In various examples the AMDB 901 is an electronic data store capable of holding data and returning data in response to a request and can be, for example, a relational database or an object database.

In various examples the AMDB 901 is coupled to the CMDB 103 through connection 904. In various examples the AMDB 901 is coupled to the BMDB 102 through connection 903. Connection 903 and connection 904 are not limited to any particular type of connection, and can include any type of connection or types of connections used to couple the AMDB 901 to the BMDB 102 or to couple the AMDB 901 the CMDB 103 including, but not limited to, database foreign keys and standard or proprietary database access protocols. In various examples the AMDB 901, the BMDB 102, and the CMDB 103 can be distinct from each other or the AMDB 901, the BMDB 102, and the CMDB 103 can reside within one or more databases.

In various examples the data correlator 101 includes a development resource identifier 905 that correlates the service definition 104 and the service development resources 902. In various examples the data correlator 101 is coupled to the AMDB 901 through connection 906. Connection 906 is not limited to any particular type of connection, and can include any type of connection or types of connections used to couple the data correlator 101 to the AMDB 901 including, but not limited to, database foreign keys and standard or proprietary database access protocols.

Figure 10:
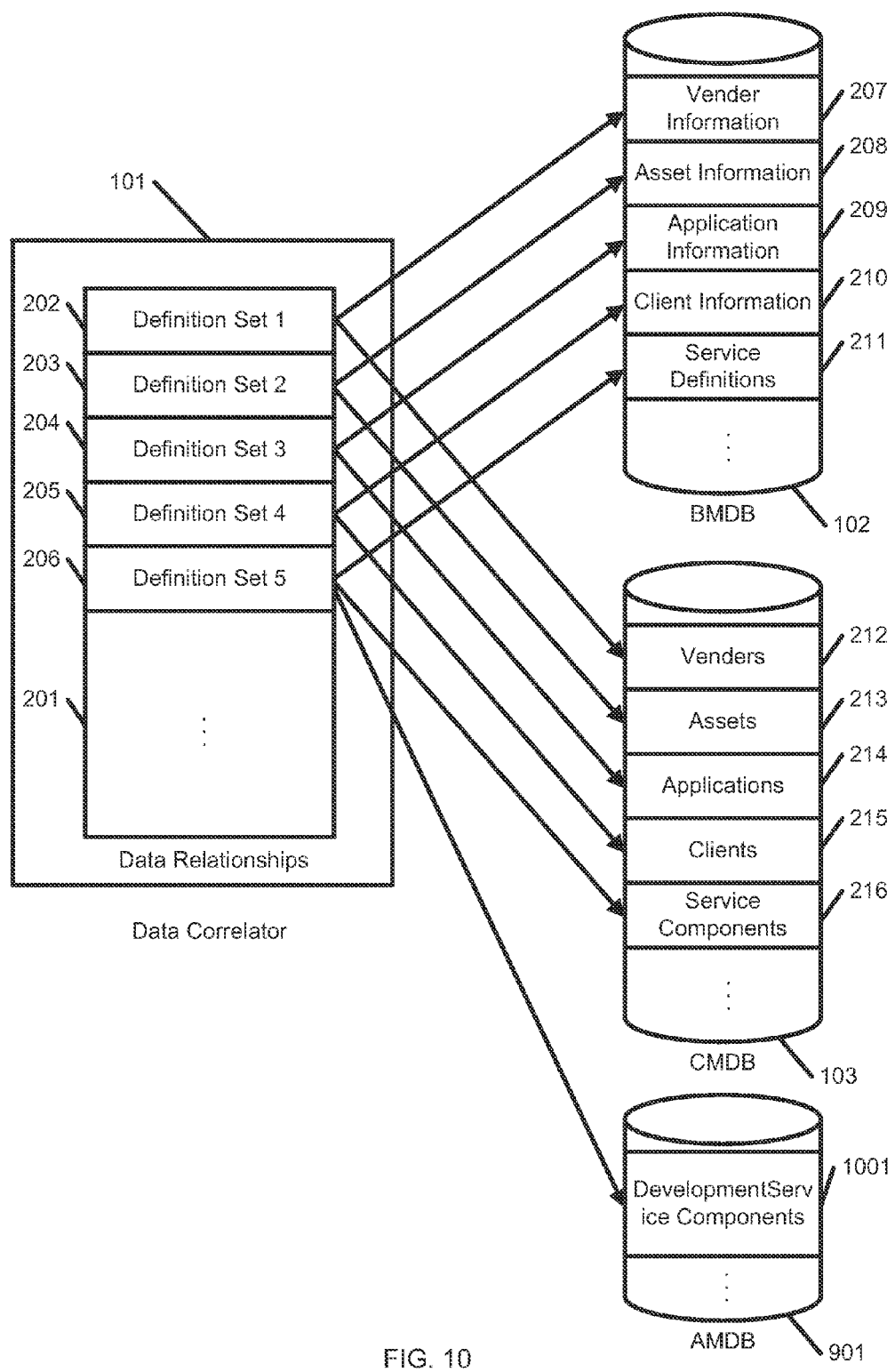
FIG. 10 illustrates an example of data relationships in an IT business decision support system.

Referring to FIG. 10, in various examples the system shown in FIG. 2, and previously described, modifies definition set 5 206 to additionally correlate the service definition 211 in the BMDB 102 with development service components 1001 stored in the AMDB 901.

Figure 11:
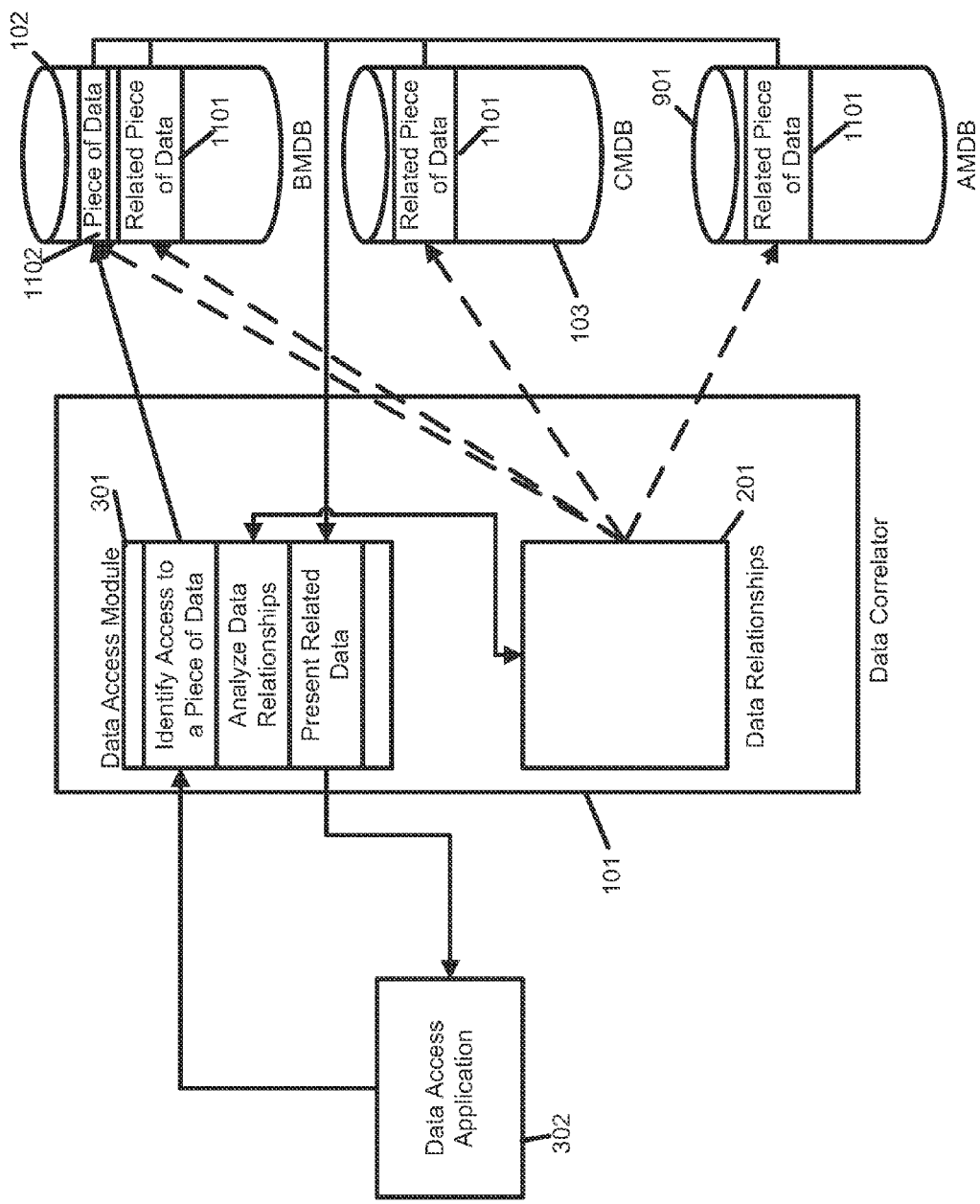
FIG. 11 illustrates an example of an IT business decision support system including a data access module and shows data flow in the system.

Referring to FIG. 11, in various examples the system shown in FIG. 3, and previously described, is modified to include the AMDB 901. FIG. 11 shows, as an example, a piece of data 1102 in the BMDB 102 accessed by the data access application 302 and related pieces of data 1101 residing on the AMDB 901, the BMDB 102, and the CMDB 103. Related pieces of data 1101. It will be understood that the related pieces of data 1101 can be the same data or different data as long as the data is related to the piece of data 1102. In various examples the piece of data 1102 can reside on any of the AMDB 901, the BMDB 102, or the CMDB 103 and a related piece of data 1101 can similarly reside on any of the AMDB 901, the BMDB 102, or the CMDB 103. In various examples there can be one or more related pieces of data 1101 associated with each piece of data 1102. Traditionally IT development has been separated from operations though both affect IT's ability to deliver services. Including the AMDB 901 can provide useful information to decision makers, in one convenient place, to understand the interoperation of IT development and operations and its effect on IT's business goals. An example can include identifying bad applications in development, cutting them, and applying their resources to other projects or operations.

Figure 12:
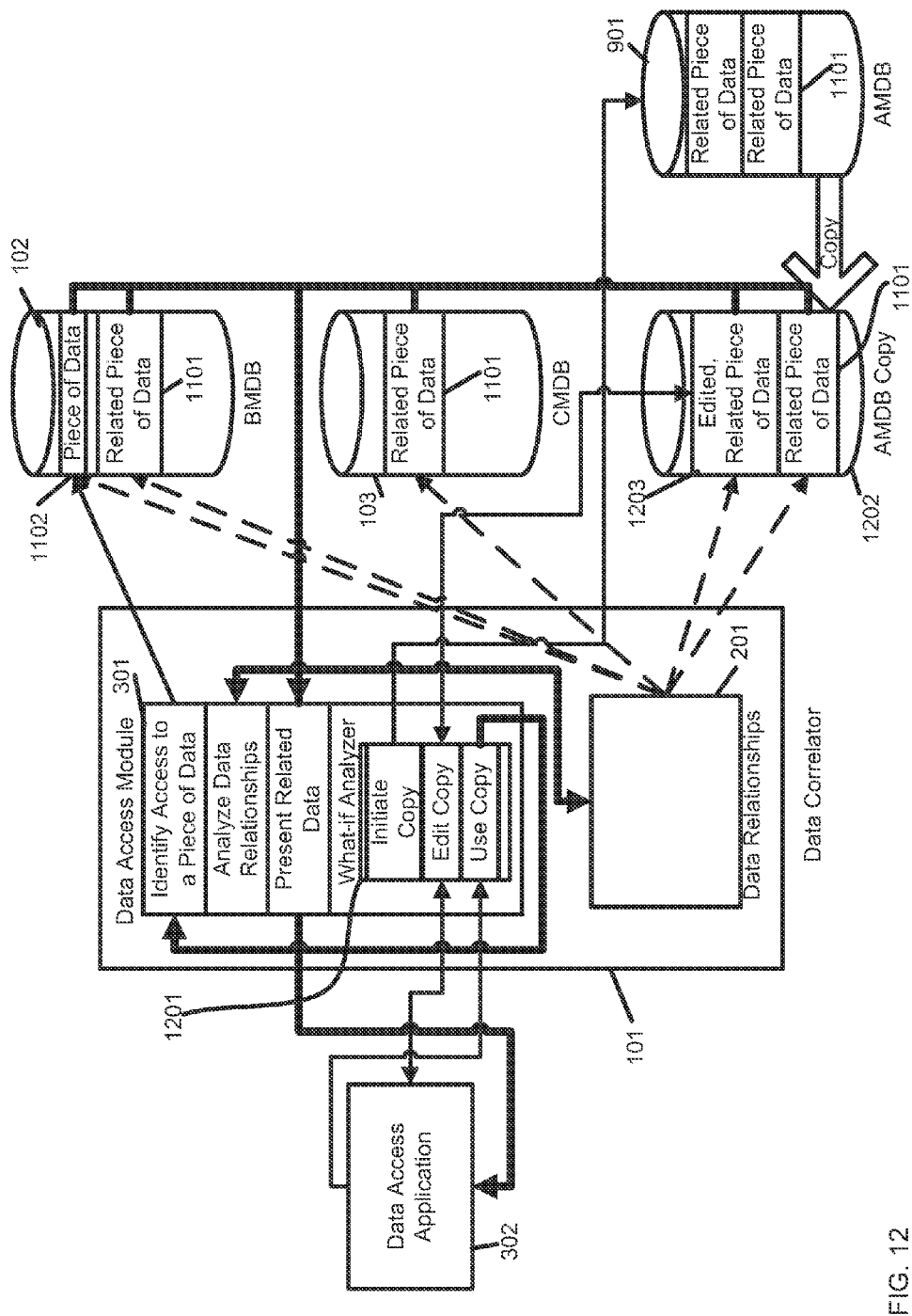
FIG. 12 illustrates an example of an IT business decision support system which includes a what-if analyzer and shows data flow in the system.

Referring to FIG. 12, in various examples, the system shown in FIG. 4, and previously described, includes the AMDB 901. The what-if analyzer 1201 operates in a similar manner as the what-if analyzer 401 shown in FIG. 4. Using the AMDB 901 as an example, the AMDB 901 is copied to the AMDB copy 1202. The AMDB copy 1202 is changed and now includes an edited, related piece of data 1203. Using the AMDB copy 1202 in place of the AMDB 901, the system shown in FIG. 11, and previously described, then presents the related pieces of data 1101 and 1203 to the data access application 302. Although FIG. 12 shows the AMDB 901 being copied, various examples would apply the same structure to the BMDB 102 or the CMDB 103. In this way, advantageously, decision makers can receive useful information involving projects or applications in development and how, for example, modifying the project or application's business parameters may effect the organization.

Figure 13:
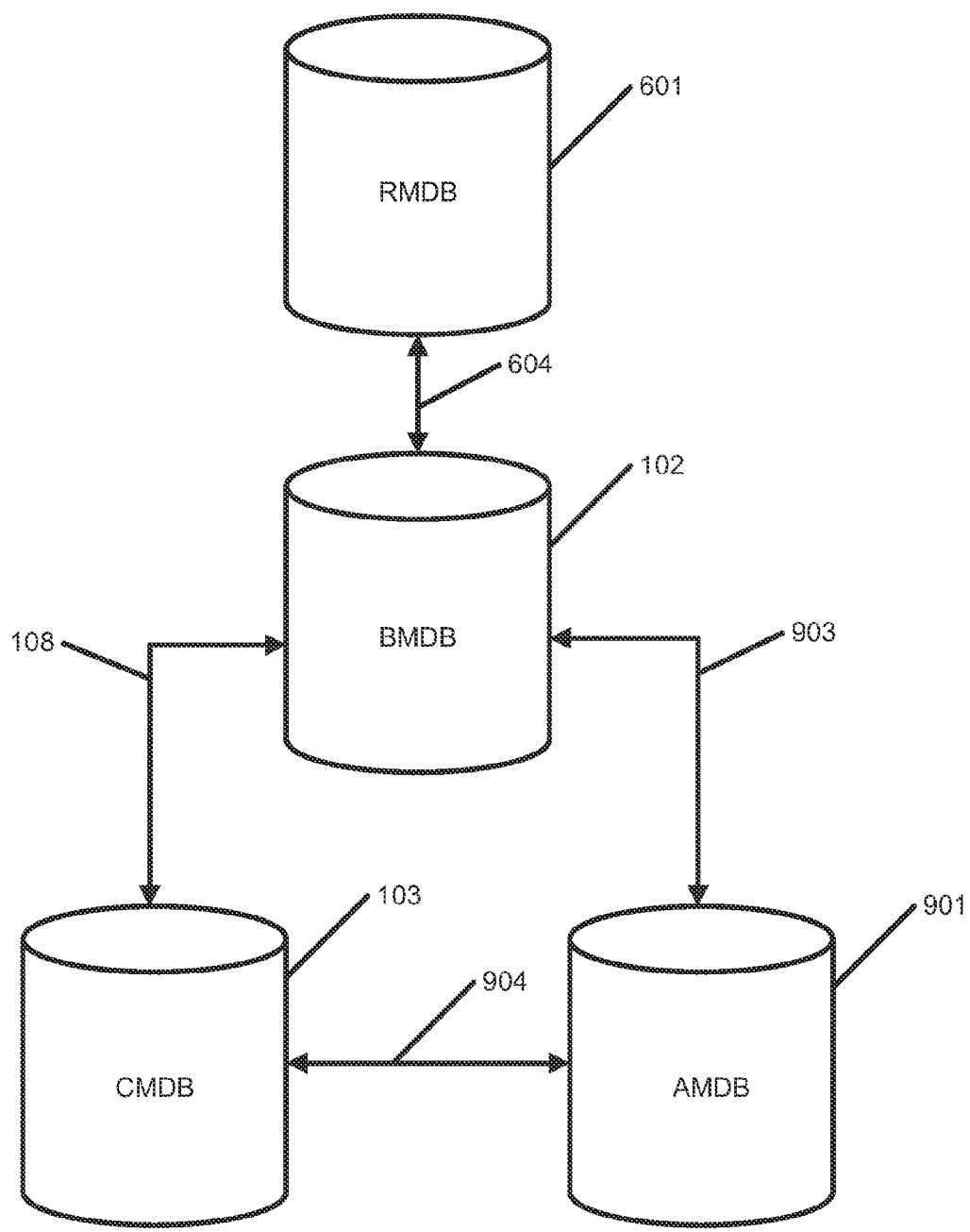
FIG. 13 illustrates an example of an IT business decision support system including a risk management database, a business management database, a configuration management database, and an application management database.

Referring to FIG. 13, in various examples all of the BMDB 102, the CMDB 103, the RMDB 601, and the AMDB 901 can be combined. In various examples the BMDB 102 is coupled to the CMDB 103 through connection 108, the RMDB 601 through connection 604, and the AMDB 901 through connection 903. The CMDB 103 is coupled to the AMDB 901 through connection 904. Connection 108, connection 604, connection 903, and connection 904 are not limited to any particular type of connection, and can include any type of connection or types of connections used to couple the BMDB 102 to the CMDB 103, the RMDB 601, or the AMDB 901 and to couple the CMDB 103 to the AMDB 901, including, but not limited to, database foreign keys and standard or proprietary database access protocols. In various examples the BMDB 102, the CMDB 103, the RMDB 601, and the AMDB 901 can be distinct from each other or can reside within one or more databases. The systems shown in FIG. 1-FIG. 12 can operate in similar ways on the combination. The combination brings together, in one convenient place, data useful for decisions makers to make informed, fact based decisions throughout IT, including, but not limited to, regulatory compliance, financial stewardship, asset tracking, and customer service goals.

Figure 14:
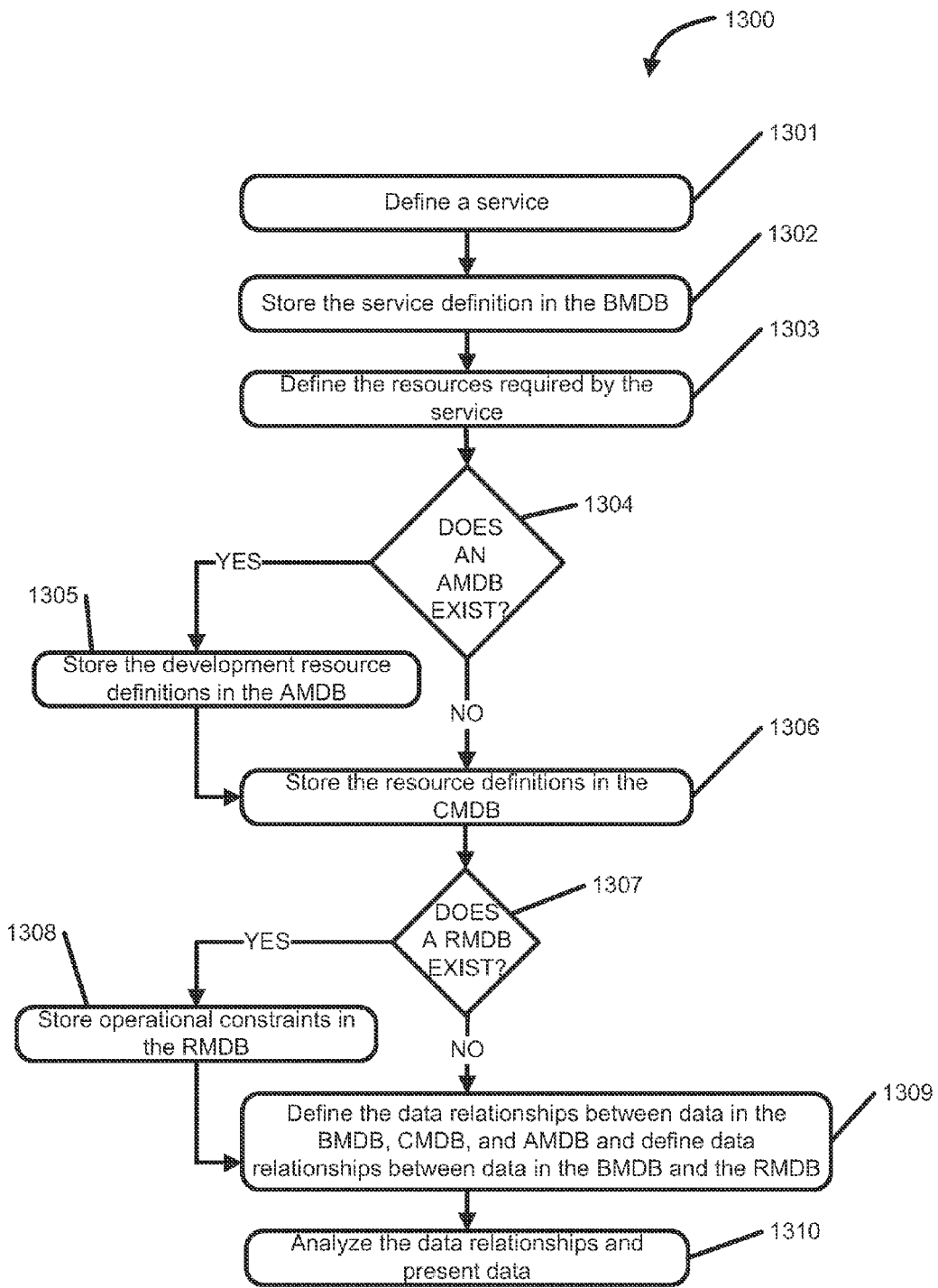
FIG. 14 illustrates a flowchart for supporting IT business decisions.

FIG. 14 illustrates a flowchart for a method 1300 supporting IT business decisions. The method 1300 can entail: defining a service; storing the service definition 104 in the BMDB 102; defining the resources required by the service; storing development resource definitions 902 in the AMDB 901 if the AMDB 901 exists; storing resource definitions 106 in the CMDB 103; storing operational constraints 602 in the RMDB 601 if the RMDB 601 exists; defining data relationships 201 between data in the BMDB 102, CMDB 103, and AMDB 901 and data relationships 201 between the BMDB 102 and RMDB 601; and analyzing the data relationships 201 to presented related data. Various components from the systems shown in FIG. 1, FIG. 6, FIG. 9, and FIG. 13 can be used to implement the method 1300 and components from those systems are used here for illustrative purposes.

At 1301 the method 1300 begins by defining one or more IT services provided to the organization. The services could include, but are not limited to, desktop support, email, or corporate financial applications.

At 1302 the service definitions 104 are stored in the BMDB 102. In various examples service definitions 104 can include one or more business policy constraints 105 as shown, and previously discussed, in FIG. 1.

At 1303 one or more resources required by the service are defined.

At 1304 a check is made as to whether the system has an AMDB 901. If the system does have an AMDB 901, at 1305 one or more development resource definitions 902 are stored in the AMDB 901. In various examples the development resource definitions 902 may also be known as service development resources 902 and represent resources used to develop future applications or projects as previously discussed with respect to FIG. 9.

At 1306 one or more service resources 106 are stored in the CMDB 103. In various examples the service resources 106 are the operational resources supporting the service as previously discussed with respect to FIG. 1.

At 1307 a check is made as to whether the system has a RMDB 601. If the system does have an RMDB 601, at 1308 one or more operational constraints 602 are stored in the RMDB 601. In various examples the operational constraints 602 constrain the organization's behavior and are due to external factors including, but not limited to, industry practice, government regulations, or statutes as previously discussed with respect to FIG. 6. In various examples the operational constraints 602 can be automatically derived by downloading electronic data from government agencies, regulatory bodies, industry groups, or any other entity that is a source of such constraints.

At 1309 data relationships 201 are defined. In various examples the data relationships 201 can be defined between data in one or more of the BMDB 102, the CMDB 103, and the AMDB 901. In various examples the data relationships 201 can be defined between data in one or both of the BMDB 102 and the RMDB 601.

At 1310 the data relationships 201 are analyzed to find related data. The related data is presented to a data access application 302, for example. In various examples this can be carried out as previously discussed with respect to FIG. 3, FIG. 7, and FIG. 11, where a piece of data 303, 702, or 1102 is in one of the BMDB 102, the CMDB 103, the RMDB 601, or the AMDB 901 and the presented data is one or more pieces of related data 304, 701, or 1101 from within the BMDB 102, the CMDB 103, the RMDB 601, or the AMDB 901. These steps support IT business decision making by making data concerning IT services conveniently available in one place to facilitate informed, fact-based decision making.

Figure 15:
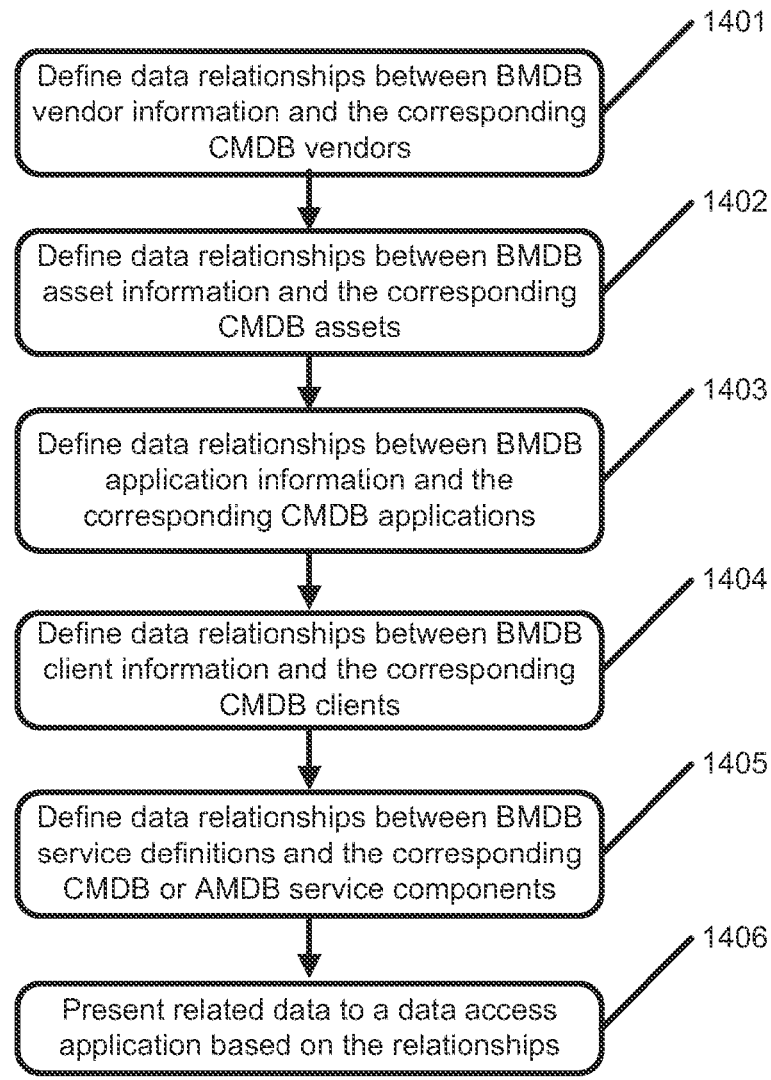
FIG. 15 illustrates a flowchart of defining data relationships.

Referring to FIG. 15, in various examples data relationships can be defined to correlate data in the BMDB 102 to data in the CMDB 103 or the AMDB 901. The data relationship definitions need not occur in the order shown in FIG. 15.

At 1401, data relationships between BMDB 102 vendor information 207 and the corresponding CMDB 103 vendors 212 are defined.

At 1402, data relationships between BMDB 102 asset information 208 and the corresponding CMDB 103 assets 213 are defined.

At 1403, data relationships between BMDB 102 application information 209 and the corresponding CMDB 103 applications 214 are defined.

At 1404, data relationships between BMDB 102 client information 210 and the corresponding CMDB 103 clients 215 are defined.

At 1405, data relationships between BMDB 102 service definitions information 211 and the corresponding CMDB 103 or AMDB 901 service components 216, 1002 are defined.

At 1406 the defined data relationships are used to present related data to, for example, a data access application 302. IT business decisions benefit from these relationships by allowing, to give one example, a decision maker to see what assets and clients can be affected by the withdrawal of a service, such as email. Bringing the data together and defining the relationships between the various pieces of data puts useful information at the fingertips of decision makers.

Figure 16:
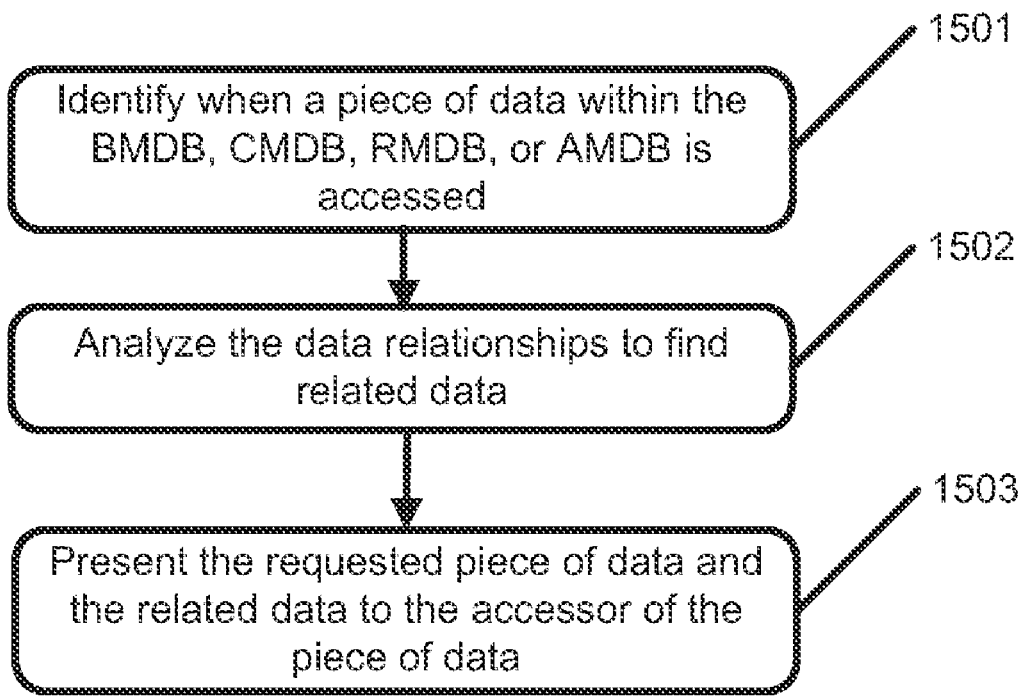
FIG. 16 illustrates a flowchart for finding related data.

Referring to FIG. 16, in various examples, at 1501 a piece of data 303, 702, or 1102 accessed from the BMDB 102, the CMDB 103, the RMDB 601, or the AMDB 901 is identified as, for example, previously described with respect to FIG. 3, FIG. 7, and FIG. 11, where the piece of data 303, 702, or 1102 is in one of the BMDB 102, the CMDB 103, the RMDB 601, or the AMDB 901. In various examples the data correlator 101 can detect the data access or can be requested to access the piece of data 303, 702, or 1102.

At 1502 the data relationships 201 are analyzed to locate one or more pieces of related data 304, 701, or 1101 from within the BMDB 102, the CMDB 103, the RMDB 601, or the AMDB 901.

At 1503 the piece of data 303, 701, or 1102 and the one or more pieces of related data 304, 701, or 1101 are presented to, for example, the data access application 302. In various examples the presented data can be the actual data or it can be a reference list informing the data access application 302 where to locate the presented data. The presented related data 304, 701, or 1101 provides IT business context to the piece of data 303, 701, or 1102 by showing what other parts of IT can be effected by a decision. This context creates a better foundation of information upon which decision makers can make better, informed, fact-based decisions.

Figure 17:
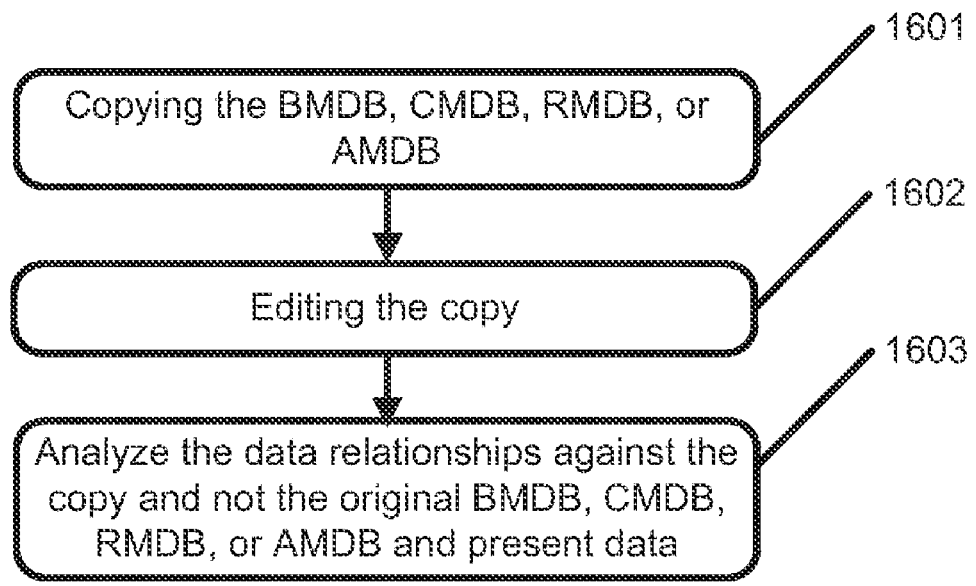
FIG. 17 illustrates a flowchart for performing what-if analysis.

Referring to FIG. 17, in various examples what-if analysis can be performed. To perform the what-if analysis, at 1610 one or more of the BMDB 102, the CMDB 103, the RMDB 601, and the AMDB 901 are copied.

At 1602 the copies are changed, or edited, in some way. In various examples the changes reflect a scenario a decision maker wishes to test, such as, for one example, reducing the time data is retained.

At 1603, if a copy was made of the BMDB 102, the CMDB 103, the RMDB 601, or the AMDB 901, the copy replaces the database it was copied from and the steps shown in FIG. 16 are applied. Going back to the scenario example above, in this way the scenario can be run, e.g. the decision maker may see that there is an operational constraint 602 on how long data must be retained; there are service resources 106 which will be affected, such as storage assets; and what the financial impact will be. Being able to run a scenario, or test out an idea, greatly benefits the decision maker's ability to identify and discard poor decisions.

Figure 18:
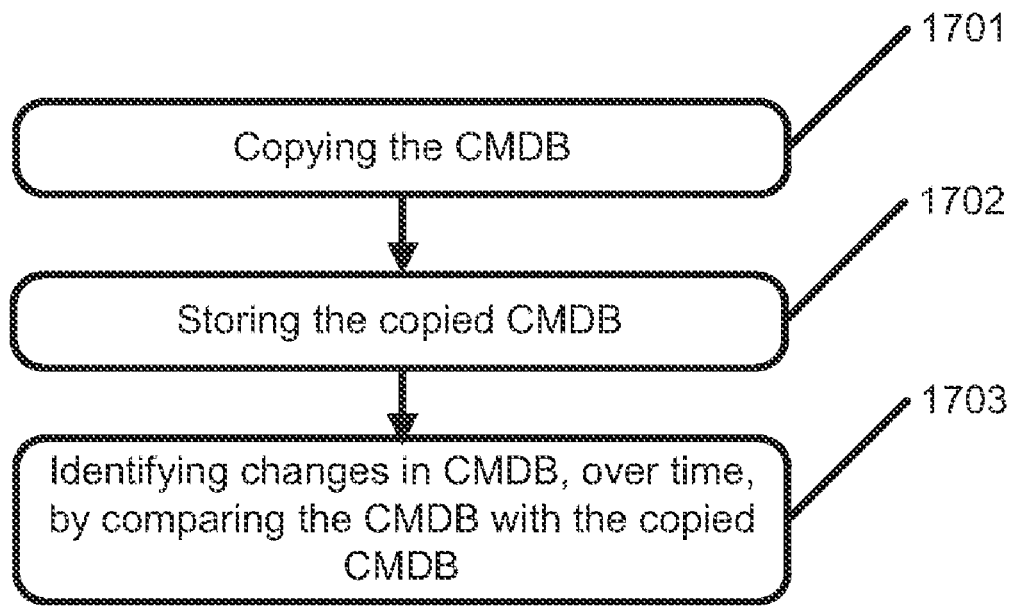
FIG. 18 illustrates a flowchart for to determine changes in a configuration management database.

Referring to FIG. 18, in various examples at 1701 a copy of the CMDB 103 is made at a particular point-in-time, resulting in a CMDB PiT copy 506, also known as a snapshot.

At 1702 the CMDB PiT copy 506 is stored in a data store. In various examples the data store is capable of holding data and returning data in response to a request and can include, for example, a relational database or an object database.

At 1703 changes in the CMDB 103 can be analyzed by retrieving a CMDB Pit copy 506 and comparing the data between the CMDB 103 and the CMDB PiT copy 506. This is useful to correlate events, such as a service outage, with configuration changes to IT's operations, such as an operating system upgrade. By storing snapshots, and retrieving snapshots taken in relevant time periods, decision makers can gain an appropriate historical perspective on the operational configuration to inform decisions intended to solve current, and future, problems.

Decision makers are expected to make informed, fact-based decisions in carrying out their roles within an organization. As previously disclosed, when decision makers query data, presenting them with related data from the BMDB, CMDB, RMDB, or AMDB aids decision makers by granting ready access to other information useful to provide context and to support informed, fact-based decisions. Additional context and information can be garnered when a decision maker uses what-if analysis to develop decisions by evaluating various scenarios. Decision makers can also gain historical configuration perspective by analyzing changes in the CMDB over time. An IT decision maker's work is greatly simplified and its quality is improved by using the methods and systems herein disclosed.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for supporting IT business decisions within an organization, the system comprising:
   at least one processor operable to execute:
      a business management database (BMDB), wherein the BMDB defines a plurality of services needed by the organization and a constraint on the plurality of services driven by a business policy;
      a configuration management database (CMDB), connected to the BMDB, wherein the CMDB defines resources required by the plurality of services; and
      a data correlator, coupled to the BMDB and the CMDB, the data correlator comprising:
         a set of data relationships, the data correlator being configured to define the set of data of data relationships as respective data relationships between data within the BMDB and the CMDB; and
         a data access module configured to:
            identify access to a particular piece of data by a data access application;
            identify one or more pieces of data related to the particular piece of data by analyzing the set of data relationships; and
            present the one or more pieces of data related to the particular piece of data to the data access application,
   wherein the set of data relationships includes:
      a first set of relationships between vendor information within the BMDB and corresponding vendors within the CMDB;
      a second set of relationships between asset information within the BMDB and corresponding assets within the CMDB;
      a third set of relationships between application information within the BMDB and corresponding applications within the CMDB;
      a fourth set of relationships between client information within the BMDB and corresponding clients within the CMDB; and
      a fifth set of relationships between service definitions within the BMDB and corresponding service components within the CMDB.

2. The system of claim 1, wherein the particular piece of data is a piece of data within the BMDB or the CMDB.

3. The system of claim 1, wherein the data correlator includes a what-if analyzer configured to:
   create respective copies of one or more of the BMDB and the CMDB;
   change the one or more respective copies; and
   use the one or more respective changed copies to provide what-if analysis of IT business decisions.

4. The system of claim 1, wherein the data correlator includes a CMDB change analyzer configured to:
   at a first point in time, create a copy of the CMDB;
   store the copy of the CMDB; and
   at a second point in time, compare the copy of the CMDB to a modified version of the CMDB to identify changes in the CMDB after the first point in time, the second point in time being later than the first point in time.

5. The system of claim 1, wherein:
   the at least one processor is further operable to execute a risk management database (RMDB), connected to the BMDB, wherein the RMDB defines an operational constraint on the organization due to an external factor; and the data correlator, correlator is further coupled to the RMDB and is further configured to define data relationships between data within the BMDB and the RMDB, the data correlator further comprising:
    a resource identifier configured to correlate the plurality of services defined by the BMDB with the resources defined by the CMDB; and
    an operational constraint driver configured to correlate the operational constraint on the organization defined by the RMDB with the constraint on the plurality of services defined by the BMDB.

6. The system of claim 5, wherein the data correlator is further configured to identify related data within the BMDB, the CMDB, or the RMDB.

7. The system of claim 5, wherein the data correlator includes a what-if analyzer configured to:
    create respective copies of one or more of the BMDB, the CMDB, and the RMDB;
    change the one or more respective copies; and
    use the one or more respective changed copies to provide what-if analysis of IT business decisions.

8. The system of claim 1, wherein:
    the at least one processor is further operable to execute an application management database (AMDB), connected to the BMDB and CMDB, wherein the AMDB defines development resources required by the plurality of services; and
    the data correlator is further coupled to the AMDB and is further configured to define data relationships between data within the BMDB, the CMDB, and the AMDB, the data correlator further comprising:
    a resource identifier configured to correlate the plurality of services defined by the BMDB with the resources defined by the CMDB; and
    a development resource identifier configured to correlate the plurality of services defined by the BMDB with the development resources defined by the AMDB.

9. The system of claim 8, wherein the data correlator is further configured to identify related data within the BMDB, the CMDB, or the AMDB.

10. The system of claim 8, wherein the data correlator includes a what-if analyzer configured to:
    create respective copies of one or more of the BMDB, the CMDB, and the AMDB;
    change the one or more respective copies; and
    use the one or more respective changed copies to provide what-if analysis of IT business decisions.

11. A computer-implemented method for supporting IT business decisions within an organization, the method comprising:
    defining a plurality of services needed by the organization and a constraint on the plurality of services driven by a business policy in a business management database (BMDB);
    defining resources required by the plurality of services in a configuration management database (CMDB);
    defining, by a data correlator, a set of data relationships between data within the BMDB and the CMDB, the data correlator comprising:
        a data access module configured to support IT business decisions by, with one or more processors:
            identifying access to a particular piece of data by a data access application;
            identifying one or more pieces of data related to the particular piece of data by analyzing the set of data relationships; and
            presenting the one or more pieces of data related to the particular piece of data to the data access application,
    wherein defining the set of data relationships includes:
        defining a first set of relationships between vendor information within the BMDB and corresponding vendors within the CMDB;
        defining a second set of relationships between asset information within the BMDB and corresponding assets within the CMDB;
        defining a third set of relationships between application information within the BMDB and corresponding applications within the CMDB;
        defining a fourth set of relationships between client information within the BMDB and corresponding clients within the CMDB; and
        defining a fifth set of relationships between service definitions within the BMDB and corresponding service components within the CMDB.

12. The computer-implemented method of claim 11, wherein the particular piece of data is a piece of data within the BMDB or the CMDB.

13. The computer-implemented method of claim 11, further comprising:
    creating respective copies of one or more of the BMDB and the CMDB;
    changing the one or more respective copies; and
    using the one or more respective changed copies to provide what-if analysis of IT business decisions.

14. The computer-implemented method of claim 11, further comprising:
    at a first point in time, creating a copy of the CMDB;
    storing the copy of the CMDB; and
    at a second point in time, comparing the copy of the CMDB to a modified version of the CMDB to identify changes in the CMDB after the first point in time, the second point in time being later than the first point in time.

15. The computer-implemented method of claim 11, further comprising:
    defining an operational constraint on the organization, the constraint due to an external factor, in a risk management database (RMDB);
    defining, by the data correlator, data relationships between data within the BMDB and the RMDB, the data correlator further comprising:
        a resource identifier configured to correlate the plurality of services defined by the BMDB with the resources defined by the CMDB; and
        an operational constraint driver configured to correlate the operational constraint on the organization defined by the RMDB with the constraint on the plurality of services defined by the BMDB.

16. The computer-implemented method of claim 15, wherein analyzing the data relationships includes identifying related data within the BMDB, the CMDB, or the RMDB.

17. The computer-implemented method of claim 11, further comprising:
    defining development resources required by the plurality of services in an application management database (AMDB);
    defining, by the data correlator, data relationships between data within the BMDB, the CMDB, and the AMDB, the data correlator further comprising:
        a resource identifier configured to correlate the plurality of services defined by the BMDB with the resources defined by the CMDB; and a development resource identifier configured to correlate the plurality of services defined by the BMDB with the development resources defined by the AMDB.

18. The computer-implemented method of claim 17, wherein analyzing the data relationships includes identifying related data within the BMDB, the CMDB, or the AMDB.

19. The system of claim 5, wherein:
the at least one processor is further operable to execute an application management database (AMDB), connected to the BMDB and CMDB, wherein the AMDB defines development resources required by the plurality of services; and
the data correlator is further coupled to the AMDB and is further configured to define data relationships between data within the BMDB, the CMDB, and the AMDB, the data correlator further comprising a development resource identifier configured to correlate the plurality of services defined by the BMDB with the development resources defined by the AMDB.

20. The system of claim 8, wherein:
the at least one processor is further operable to execute a risk management database (RMDB), connected to the BMDB, wherein the RMDB defines an operational constraint on the organization due to an external factor; and
the data correlator is further coupled to the RMDB and is further configured to define data relationships between data within the BMDB and the RMDB, the data correlator further comprising an operational constraint driver configured to correlate the operational constraint on the organization defined by the RMDB with the constraint on the plurality of services defined by the BMDB.

21. The computer-implemented method of claim 11, further comprising:
defining development resources required by the plurality of services in an application management database (AMDB); and
defining, by the data correlator, data relationships between data within the BMDB, the CMDB, and the AMDB, the data correlator further comprising a development resource identifier configured to correlate the plurality of services defined by the BMDB with the development resources defined by the AMDB.

22. The computer-implemented method of claim 17, further comprising:
defining an operational constraint on the organization, the constraint due to an external factor, in a risk management database (RMDB); and
defining, by the data correlator, data relationships between data within the BMDB and the RMDB, the data correlator further comprising an operational constraint driver configured to correlate the operational constraint on the organization defined by the RMDB with the constraint on the plurality of services defined by the BMDB.

* * * * *

UNITED STATES PATENT AND TRADEMARK OFFICE
CERTIFICATE OF CORRECTION

PATENT NO.        : 8,335,692 B2                                    Page 1 of 1
APPLICATION NO.   : 12/604592
DATED             : December 18, 2012
INVENTOR(S)       : Alpesh Sheth et al.

It is certified that error appears in the above-identified patent and that said Letters Patent is hereby corrected as shown below:

In column 17, line 1, in claim 5, after "data" delete "correlator,".

Signed and Sealed this
Nineteenth Day of February, 2013

Teresa Stanek Rea
*Acting Director of the United States Patent and Trademark Office*